(12) United States Patent
Hwang et al.

(10) Patent No.: US 10,048,899 B2
(45) Date of Patent: Aug. 14, 2018

(54) STORAGE DEVICE, COMPUTING SYSTEM INCLUDING THE STORAGE DEVICE, AND METHOD OF OPERATING THE STORAGE DEVICE

(71) Applicant: SAMSUNG ELECTRONICS CO., LTD., Suwon-si, Gyeonggi-Do (KR)

(72) Inventors: Myeong-Eun Hwang, Seongnam-si (KR); Ki-Jo Jung, Gwacheon-si (KR); Tae-Hack Lee, Hwaseong-si (KR); Kwang-Ho Choi, Seoul (KR); Sang-Kyoo Jeong, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 203 days.

(21) Appl. No.: 14/613,462

(22) Filed: Feb. 4, 2015

(65) Prior Publication Data

US 2015/0317084 A1 Nov. 5, 2015

(30) Foreign Application Priority Data

Apr. 30, 2014 (KR) .................. 10-2014-0052972

(51) Int. Cl.
*G06F 12/00* (2006.01)
*G06F 3/06* (2006.01)
*G06F 13/00* (2006.01)
*G06F 13/38* (2006.01)

(52) U.S. Cl.
CPC ............ *G06F 3/0683* (2013.01); *G06F 3/064* (2013.01); *G06F 3/0608* (2013.01); *G06F 13/00* (2013.01); *G06F 13/385* (2013.01)

(58) Field of Classification Search
CPC ...... G06F 12/00; G06F 12/08; G06F 12/0811; G06F 12/0862; G06F 3/06
USPC .................................. 711/100, 118, 154, 200
See application file for complete search history.

(56) References Cited

U.S. PATENT DOCUMENTS

| | | | | |
|---|---|---|---|---|
| 5,148,536 A | * | 9/1992 | Witek | G06F 9/383 711/140 |
| 6,148,368 A | * | 11/2000 | DeKoning | G06F 12/0866 710/53 |
| 6,460,122 B1 | * | 10/2002 | Otterness | G06F 11/1076 711/122 |
| 7,685,524 B2 | * | 3/2010 | Rekimoto | G06F 3/002 701/408 |
| 7,809,873 B2 | | 10/2010 | Perry et al. | |
| 8,234,317 B1 | | 7/2012 | Pogde | |

(Continued)

FOREIGN PATENT DOCUMENTS

KR 1020110067795 6/2011

*Primary Examiner* — Tuan Thai
(74) *Attorney, Agent, or Firm* — F. Chau & Associates, LLC

(57) ABSTRACT

A storage device includes a storage medium and a controller configured to control the storage medium. The controller includes an interface unit configured to interface with a host, a processing unit connected to the interface unit via a first signal line and configured to process a direct load operation and a direct store operation between the host and the controller, and at least one memory connected to the interface unit via a second signal line. The at least one memory is configured to temporarily store data read from the storage medium or data received from the host, and is configured to be directly accessed by the host.

19 Claims, 30 Drawing Sheets

(56) References Cited

U.S. PATENT DOCUMENTS

| | | | |
|---|---|---|---|
| 8,527,693 B2 | 9/2013 | Flynn et al. | |
| 9,037,793 B1 * | 5/2015 | O'Brien, III | G06F 3/0689 |
| | | | 711/114 |
| 2002/0013891 A1 * | 1/2002 | Arnold | G06F 9/3001 |
| | | | 712/32 |
| 2003/0120883 A1 * | 6/2003 | Farrall | G06F 9/3802 |
| | | | 711/169 |
| 2008/0270692 A1 * | 10/2008 | Cochran | G06F 12/0804 |
| | | | 711/114 |
| 2011/0252183 A1 | 10/2011 | Cho et al. | |
| 2011/0302475 A1 | 12/2011 | Eisenhuth et al. | |
| 2012/0124300 A1 | 5/2012 | Teyssier et al. | |
| 2013/0060993 A1 | 3/2013 | Park et al. | |
| 2013/0097369 A1 | 4/2013 | Talagala et al. | |
| 2013/0212321 A1 | 8/2013 | Talagala et al. | |
| 2013/0227174 A1 | 8/2013 | Stenfort | |
| 2013/0227201 A1 | 8/2013 | Talagala et al. | |
| 2013/0297865 A1 | 11/2013 | Gupta | |
| 2014/0089582 A1 * | 3/2014 | Kobayashi | G06F 3/0614 |
| | | | 711/114 |
| 2014/0189212 A1 * | 7/2014 | Slaight | G06F 12/0866 |
| | | | 711/103 |
| 2015/0058557 A1 * | 2/2015 | Madhusudana | G06F 3/0655 |
| | | | 711/114 |
| 2015/0286438 A1 * | 10/2015 | Simionescu | G06F 12/0866 |
| | | | 711/103 |

* cited by examiner

STORAGE DEVICE, COMPUTING SYSTEM INCLUDING THE STORAGE DEVICE, AND METHOD OF OPERATING THE STORAGE DEVICE

CROSS-REFERENCE TO RELATED APPLICATIONS

This application claims priority under 35 U.S.C. § 119 to Korean Patent Application No. 10-2014-0052972, filed on Apr. 30, 2014, the disclosure of which is incorporated by reference herein in its entirety.

TECHNICAL FIELD

Exemplary embodiments of the present inventive concept relate to a storage device, and more particularly, to a storage device, a computing system including the storage device, and a method of operating the storage device.

DISCUSSION OF THE RELATED ART

Recently, a solid state drive (SSD) using a nonvolatile memory device has been developed as a next generation storage device used in place of a hard disk drive (HDD). An SSD replaces a mechanical configuration of an HDD with a nonvolatile memory device, resulting in a high operating speed and stability while occupying a smaller amount of space.

SUMMARY

According to an exemplary embodiment of the present inventive concept a storage device includes a storage medium and a controller configured to control the storage medium. The controller includes an interface unit interfacing with a host, a processing unit connected to the interface unit via a first signal line and configured to process a direct load operation or a direct store operation between the host and the controller, and at least one memory connected to the interface unit via a second signal line. The at least one memory temporarily stores data read from the storage medium or data received from the host and is directly accessible by the host.

The interface unit may be a first interface unit interfacing with the host according to a first standardized interface, and the controller may further include a second interface unit interfacing with the first interface unit according to a second standardized interface.

The first signal line may directly connect the first interface unit and the processing unit to each other, not via the second interface unit, and the second signal line may directly connect the first interface unit and the at least one memory to each other, not via the second interface unit.

The first standardized interface may be a peripheral component interconnect express (PCIe) and the second standardized interface may be a nonvolatile memory express (NVMe) or a small computer system interface express (SCSIe).

The processing unit may include at least one processor configured to process the direct load operation or the direct store operation, and at least one tightly coupled memory (TCM) disposed adjacent to the at least one processor and accessible by the at least one processor within a relatively short time period.

The at least one TCM may temporarily store a data transfer command between the controller and the storage medium.

The data transfer command may include a flush command for transferring data temporarily stored in the at least one memory to the storage medium and a fill command for transferring the data stored in the storage medium to the at least one memory.

The at least one TCM may include at least one special function register (SFR) used to perform the direct load operation or the direct store operation.

The at least one memory may include at least one of a first memory temporarily storing raw data read from the storage medium or raw data received from the host, and a second memory temporarily storing metadata relating to the raw data.

The at least one of the first memory and the second memory may include at least one SFR used to perform the direct load operation or the direct store operation.

The interface unit may include a signal transfer unit configured to transmit and receive a signal to and from the host, and an address conversion unit configured to perform an address conversion between an external address of the signal and an internal address suitable for internal communication within the controller.

The controller may include a first bus connected to the interface unit, a second bus connected to the processing unit, and a third bus connected to the at least one memory. The first signal line may be directly connected between the first bus and the second bus, and the second signal line may be directly connected between the first bus and the third bus.

According to an exemplary embodiment of the present inventive concept, a computing system includes a storage device including a storage medium and a controller configured to control the storage medium and including at least one memory, and a host configured to directly access the at least one memory with reference to an address map having an address space corresponding to the at least one memory.

The host may include a processor and a main memory connected to the processor. The processor may directly access the at least one memory, not via the main memory.

The controller may further include an interface unit interfacing with the host, and a processing unit connected to the interface unit via a first signal line and configured to process a direct load operation and a direct store operation between the host and the controller. The at least one memory may be connected to the interface unit via a second signal line, and may temporarily store data read from the storage medium or data received from the host.

The processing unit may include at least one processor configured to process the direct load operation or the direct store operation, and at least one tightly coupled memory (TCM) disposed adjacent to the at least one processor and accessible by the at least one processor within a relatively short time period.

The at least one memory and the at least one TCM may be respectively mapped to address spaces that are exclusive from each other in the address map.

The host may include a plurality of base address registers (BARs) storing the address map. At least one BAR from the plurality of BARs may store address spaces that are exclusive from each other and used to perform the direct load operation and the direct store operation with respect to the at least one memory.

According to an exemplary embodiment of the present inventive concept, a method of operating a storage device including a storage medium and a controller for controlling the storage medium and including at least one memory includes receiving a direct load command instructing a direct load operation to be executed or a direct store command instructing a direct store operation to be executed from a host, and determining a state of the at least one memory for performing the direct load operation or the direct store operation. The at least one memory may be directly accessed by the host, and the direct load operation or the direct store operation may be performed between the host and the at least one memory by loading data temporarily stored in the at least one memory to the host or temporarily storing data received from the host in the at least one memory based on a result of the determining.

The determining of the state of the at least one memory may include, when the direct load command is received from the host, determining whether there is first data corresponding to the direct load command in the at least one memory, and when the direct store command is received from the host, determining whether there is available space for storing second data corresponding to the direct store command in the at least one memory.

The performing of the direct load operation or the direct store operation may include, if the first data is not stored in the at least one memory, performing a fill operation for transmitting the first data from the storage medium to the at least one memory, and when the fill operation is finished, loading the first data to the host.

The performing of the direct load operation or the direct store operation may include, if there is no available space in the at least one memory, performing a flush operation for transmitting data temporarily stored in the at least one memory to the storage medium, and when the flush operation is finished, temporarily storing the second data in the at least one memory.

The method may further include, before receiving the direct load command or the direct store command, storing device information relating to the storage device in the at least one memory so that the host may recognize the device information for performing the direct load operation or the direct store operation.

The storing of the device information in the at least one memory may include loading the device information in the at least one memory from the storage medium according to an operation initiation signal or an initialization command, and writing the device information in the at least one memory by the host.

The controller may include at least one processor, and at least one tightly coupled memory (TCM) disposed adjacent to the at least one processor and accessible by the at least one processor within a relatively short time period. The at least one memory and the at least one TCM are respectively mapped to address spaces that are exclusive from each other in the address map.

According to an exemplary embodiment of the present inventive concept, a computing system includes a storage device including a storage medium and a controller configured to control the storage medium. The controller includes a processing unit and at least one memory. The computing system further includes a host including a processor and a main memory connected to the processor. The processor is configured to directly access the at least one memory without accessing the main memory.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Figure 1:
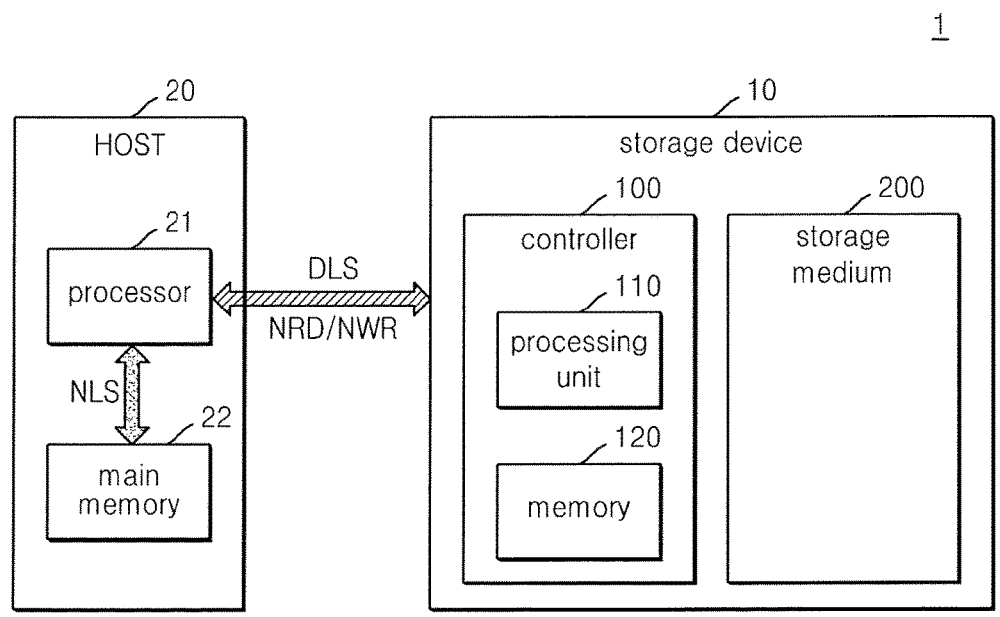
FIG. 1 is a block diagram of a computing system according to an exemplary embodiment of the present inventive concept.

Exemplary embodiments of the present inventive concept will be described more fully hereinafter with reference to the accompanying drawings. Like reference numerals may refer to like elements throughout the accompanying drawings.

While such terms as "first," "second," etc., may be used to describe various components, such components are not limited by these terms. The above terms are used only to distinguish one component from another. For example, a first element may be designated as a second element, and similarly, a second element may be designated as a first element without departing from the teachings of the present inventive concept.

FIG. 1 is a block diagram of a computing system 1 according to an exemplary embodiment of the present inventive concept.

Referring to FIG. 1, the computing system 1 may include a storage device 10 and a host 20. The host 20 may include a processor 21 and a main memory 22. In addition, the storage device 10 may include a controller 100 and a storage medium 200. The controller 100 may include a processing unit 110 and at least one memory 120.

The host 20 may be, for example, a user device such as a personal/portable computer (e.g., a desktop computer, a laptop computer, a smartphone, a tablet computer, etc.), a personal digital assistant (PDA), a portable multimedia player (PMP), an MP3 player, etc.

The storage medium 200 may be, for example, a non-volatile memory device having a large storage capacity. In an exemplary embodiment, the storage medium 200 may include a plurality of nonvolatile memory devices. In this case, each of the nonvolatile memory devices may be connected to the controller 100 by a channel unit.

In exemplary embodiments of the present inventive concept, the storage medium 200 may include a NAND-type flash memory. The NAND-type flash memory may be, for example, a three-dimensional (3D) vertical NAND-type flash memory or a NAND-type flash memory having a two-dimensional (2D) horizontal structure. However, the storage medium 200 is not limited thereto. For example, the storage medium 200 may be a resistive memory such as a resistive random access memory (RRAM), a phase change RAM (PRAM), or a magnetic RAM (MRAM).

The computing system 1 may perform various computing operations according to a load command and a store command. For example, in an exemplary embodiment, the load command may instruct the computing system 1 to read data from the memory 120 and store the data in a certain register in the processor 21, and the store command may instruct the computing system 1 to record a value included in a certain register of the processor 21 in the memory 120.

According to a normal load/store (NLS) operation, the processor 21 may access the main memory 22 in the host 20. For example, in the normal load operation, the processor 21 loads data from the main memory 22, and in the normal store operation, the processor 21 may temporarily store the data in the main memory 22. The NLS operation may be performed by, for example, a memory management unit included in the host 20.

According to a normal read operation (NRD) and a normal write operation (NWR), using the NLS operation, the data may be transmitted between the processor 21 and the main memory 22 and between the main memory 22 and the storage device 10. The data transfer between the main memory 22 and the storage device 10 may be performed by the controller 100.

Referring to the NRD operation, the data is transferred from the storage device 10 to the main memory 22 and temporarily stored in the main memory 22, and the data temporarily stored in the main memory 22 may then be transferred to the processor 21. Referring to the NWR operation, the data is temporarily stored in the main memory 22 first, and the data temporarily stored in the main memory 22 is then transferred to the storage device 10 to be stored in the storage device 10. Accordingly, it may take a relatively long amount of time to perform the reading/writing of the data using the NRD/NWR operations.

According to a direct load/store (DLS) operation in accordance with exemplary embodiments of the present inventive concept, the processor 21 may directly access the storage device 10 without accessing the main memory 22 (e.g., without passing through the main memory 22). For example, the processor 21 may directly access at least one memory 120 included in the controller 100 of the storage device 10.

Referring to the direct load operation, the processor 21 may load data from the at least one memory 120, and in the direct store operation, the processor 21 may temporarily store the data in the at least one memory 120. The DLS operations may be performed by, for example, a device driver included in the host 20 and the controller 100 included in the storage device 10.

The at least one memory 120 included in the storage device 10 may act as the main memory 22 of the host 20, and accordingly, performance degradation caused by a limitation in the capacity of the main memory 22 may be reduced or prevented. Also, according to direct read/write operations performed using the DLS operations, the amount of time taken to read/write data may be relatively short. As a result, the operating speed of the computing system 1 may be increased.

Figure 2:
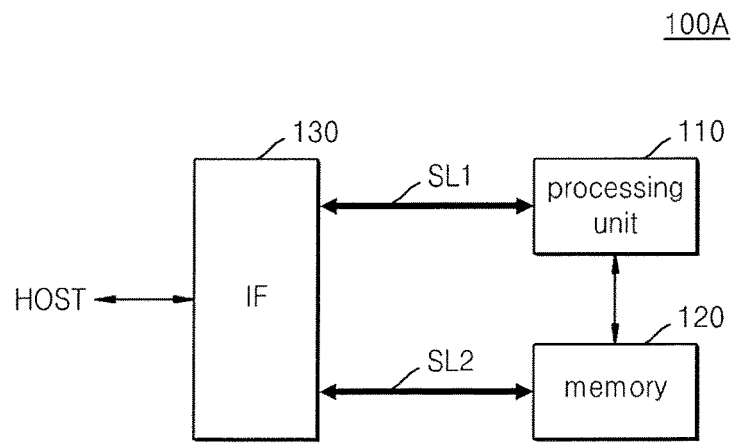
FIG. 2 is a block diagram of an example of the controller included in a storage device shown in FIG. 1 according to an exemplary embodiment of the present inventive concept.

FIG. 2 is a block diagram of an example of a controller 100A included in the storage device 10 of FIG. 1 according to an exemplary embodiment of the present inventive concept.

Referring to FIGS. 1 and 2, the controller 100A may include the processing unit 110, the at least one memory 120, and an interface unit 130.

The interface unit 130 may interface with the host 20. For example, the interface unit 130 may interface with the host 20 according to a first standardized interface. The first standardized interface may be, for example, a peripheral component interconnect express (PCIe). However, the first standardized interface is not limited thereto. For example, the first standardized interface may be a universal serial bus (USB), small computer system interface (SCSI), SCSI express (SCSIe), peripheral component interconnect (PCI), advanced technology attachment (ATA), parallel ATA (PATA), serial ATA (SATA), serial attached SCSI (SAS), enhanced small device interface (ESDI), or integrated drive electronics (IDE).

The processing unit 110 may be connected to the interface unit 130 via a first signal line SL1, and may perform the direct load operation or the direct store operation between the host 20 and the controller 100A. In addition, the processing unit 110 may control overall operations of the controller 100A.

The at least one memory 120 may be connected to the interface unit 130 via a second signal line SL2, and may temporarily store the data read from the storage medium 200 or the data transferred from the host 20. In an exemplary embodiment, the at least one memory 120 may be directly accessed by the host 20. The at least one memory 120 is also connected to the processing unit 110 to temporarily store data according to control of the processing unit 110.

The first and second signal lines SL1 and SL2 may be referred to herein as buses, metal lines, or data/signal paths. Each of the first and second signal lines SL1 and SL2 may communicate bi-directionally.

Figure 3:
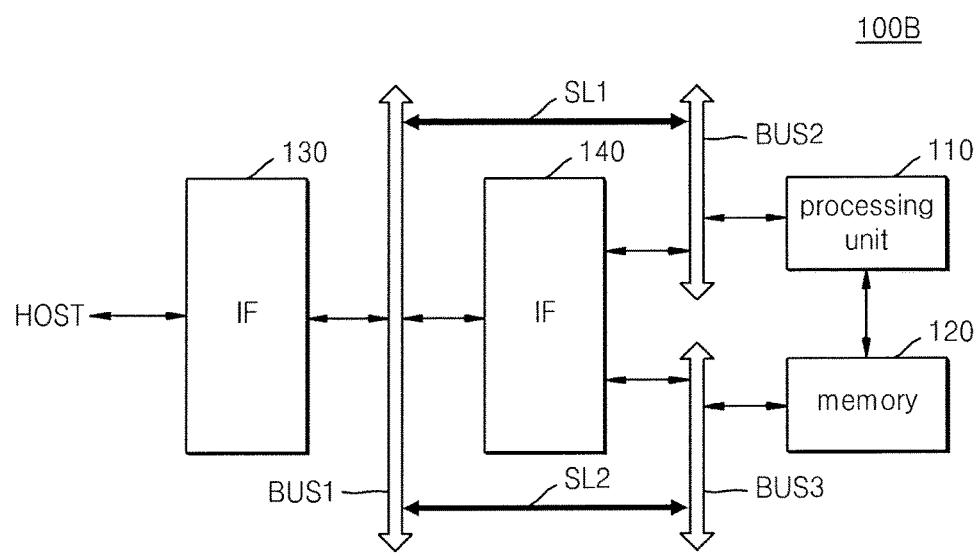
FIG. 3 is a block diagram of an example of the controller included in the storage device shown in FIG. 1 according to an exemplary embodiment of the present inventive concept.

FIG. 3 is a block diagram of another example of the controller 100B included in the storage device 10 of FIG. 1 according to an exemplary embodiment of the present inventive concept.

Referring to FIGS. 1 and 3, the controller 100B may include the processing unit 110, the at least one memory 120, the first interface unit 130, and a second interface unit 140. Some of the components included in the controller 100B of the exemplary embodiment shown in FIG. 3 may be substantially the same as those of the controller 100A shown in FIG. 2. For convenience of description, like components may be denoted by like reference numerals, and may not be repeatedly described. Hereinafter, differences between the controller 100A shown in FIG. 2 and the controller 100B shown in FIG. 3 will be described.

The first interface unit 130 may interface with the host 20. For example, the first interface unit 130 may interface with the host 20 according to the first standardized interface (e.g., PCIe), as described above. However, as described above, the first standardized interface is not limited thereto.

The second interface unit 140 may interface with the first interface unit 130. For example, the second interface unit 140 may interface with the first interface unit 130 according to a second standardized interface. The second standardized interface may be, for example, Nonvolatile Memory Express (NVMe), Nonvolatile Memory Host Controller Interface Specification (NVMHCI), or Small Computer System Interface Express (SCSIe). However, the second standardized interface is not limited thereto, and may be another type of interface.

The controller 100B may further include a first bus BUS1, a second bus BUS2, and a third bus BUS3. The first bus BUS1 is connected to the first interface unit 130 and provides a communication path between the first interface unit 130 and the other components. The second bus BUS2 is connected to the processing unit 110 and provides a communication path between the processing unit 110 and the other components. The third bus BUS3 is connected to the at least one memory 120 and provides a communication path between the at least one memory 120 and the other components.

The first through third buses BUS1, BUS2, and BUS3 may be implemented as, for example, a network interface card (NIC) or a bus matrix. For example, the bus matrix may be an advanced extended interface (AXI) interconnect of Advanced Microcontroller Bus Architecture 3 (AMBA3). The AXI interconnect is a bus matrix structure having a plurality of channels, and may connect a plurality of bus masters and a plurality of bus slaves to the plurality of channels at the same time using a multiplexer and a demultiplexer.

The first interface unit 130 may interface with the host 20, and the second interface unit 140 may interface with the first interface unit 130. Accordingly, some of signals output from the second interface unit 140 may be transferred to the processing unit 110 via the second bus BUS2, and the other signals may be transferred to the at least one memory 120 via the third bus BUS3. As described above, if the signals generated by the host 20 are transferred to the processing unit 110 and the at least one memory 120 via the first interface unit 130 and the second interface unit 140, it may take a relatively long time to transfer the signals, and thus, the operating speed of the computing system 1 may be reduced.

According to an exemplary embodiment, the first signal line SL1 may be directly connected between the first bus BUS1 and the second bus BUS2, and the second signal line SL2 may be directly connected between the first bus BUS1 and the third bus BUS3. Accordingly, the signals generated by the host 20 may be transferred from the first interface unit 130 to the processing unit 110 and the at least one memory 120 without passing through the second interface unit 140. Accordingly, the time taken to transfer the signals may be reduced and the operating speed of the computing system 1 may be improved. Therefore, a memory accessing speed between the host 20 and the storage device 10 may be increased.

Figure 4:
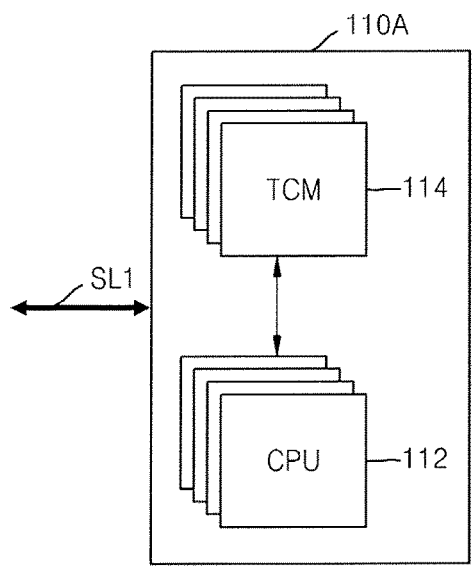
FIG. 4 is a block diagram of an example of a processing unit included in the controller of FIG. 2 according to an exemplary embodiment of the present inventive concept.

FIG. 4 is a block diagram of an example 110A of the processing unit 110 included in the controller 100A of FIG. 2 according to an exemplary embodiment of the present inventive concept.

Referring to FIG. 4, the processing unit 110A may include at least one processor 112 and at least one tightly coupled memory (TCM) 114. The processing unit 110A may further include firmware performing the direct load/store operations described above.

In the exemplary embodiment shown in FIG. 4, four processors 112 and four TCMs 114 are provided. However, exemplary embodiments of the present inventive concept are not limited thereto. For example, according to exemplary embodiments, the number of the at least one processor 112 may be less than or greater than four, and the number of the at least one TCM 114 may be less than or greater than four.

The at least one processor 112 may perform the direct load operation or the direct store operation described above. The at least one processor 112 may be referred to herein as a central processing unit (CPU). In the exemplary embodiment shown in FIG. 4, since there is more than one processor 112, the storage device 10 may perform multi-core processing and the operating speed of the storage device 10 may be increased.

The at least one. TCM 114 may be disposed adjacent to the at least one processor 112 and may be accessed by the at least one processor 112 within a relatively short amount of time, for example, within one cycle time or a few cycle times. For example, each TCM 114 may be connected to a corresponding processor 112 via a dedicated channel and may act as a dedicated memory of the corresponding processor 112. The at least one TCM 114 may be disposed adjacent to the at least one processor 112. Herein, when the at least one TCM 114 is described as being disposed adjacent to the at least one processor 112, it is to be understood that the at least one TCM 114 is disposed directly next to or near the at least one processor 112. For example, there may be no other components disposed between the at least one TCM 114 and the at least one processor 112. Further, the at least one TCM 114 and the at least one processor 112 may be directly connected to each other via a dedicated connection.

In an exemplary embodiment, the at least one TCM 114 may store a data transfer command that is transmitted between the controller 110A and the storage medium 200. The data transfer command may include, for example, a flush command for transferring the data temporarily stored in the at least one memory 120 to the storage medium 200, and a fill command for transferring the data stored in the storage medium 200 to the at least one memory 120. The flush command and the fill command are described in further detail with reference to FIGS. 26 and 30.

Figure 5:
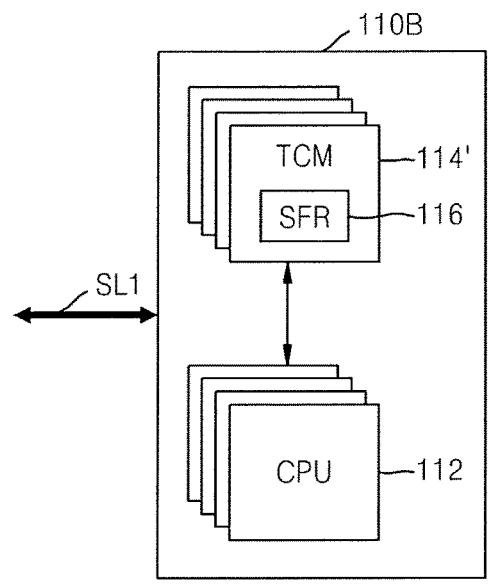
FIG. 5 is a block diagram of an example of the processing unit included in the controller of FIG. 2 according to an exemplary embodiment of the present inventive concept.

FIG. 5 is a block diagram of another example of the processing unit 110B included in the controller 100A of FIG. 2 according to an exemplary embodiment of the present inventive concept.

Referring to FIG. 5, the processing unit 110B may include at least one processor 112 and at least one TCM 114'. The at least one TCM 114' may include at least one special function register (SFR) 116. The processing unit 110B may further include firmware performing the direct load/store operations described above.

Some of the components included in the processing unit 110B of the exemplary embodiment shown in FIG. 5 may be substantially the same as those of the processing unit 110A shown in FIG. 4. For convenience of description, like components may be denoted by like reference numerals, and may not be repeatedly described.

The at least one SFR 116 may be used to perform the direct load operation or the direct store operation described above. For example, the at least one SFR 116 may store a doorbell representing initiation of the direct load operation or the direct store operation. The doorbell is described in further detail below. The at least one SFR 116 will be described in further detail with reference to FIG. 9.

Figure 6:
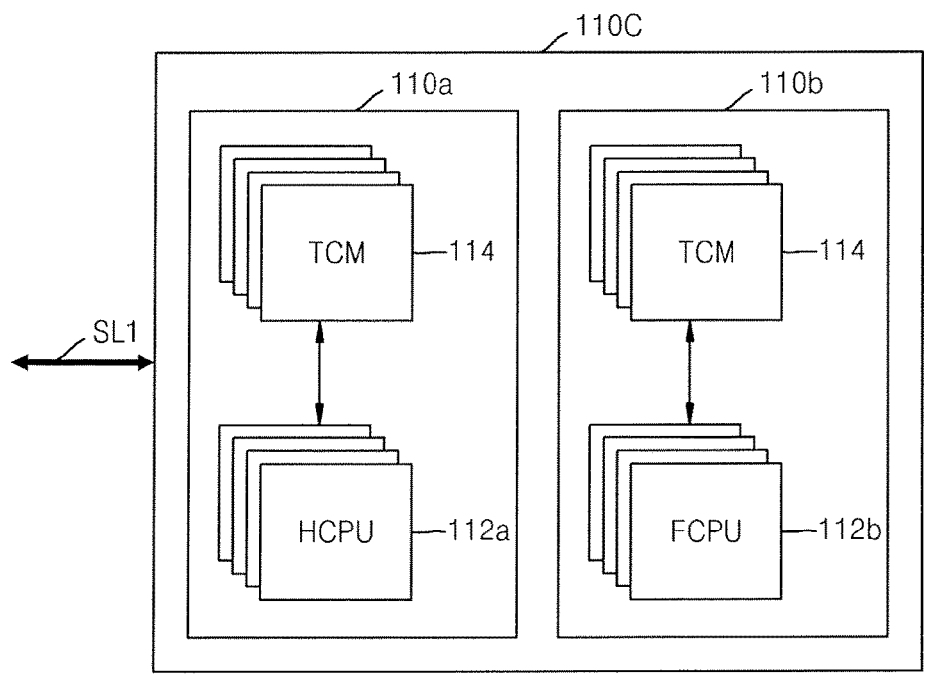
FIG. 6 is a block diagram of an example of the processing unit included in the controller of FIG. 2 according to an exemplary embodiment of the present inventive concept.

FIG. 6 is a block diagram of another example of the processing unit 110C included in the controller 100A of FIG. 2 according to an exemplary embodiment of the present inventive concept.

Referring to FIG. 6, the processing unit 110C may include a first processing unit 110a and a second processing unit 110b. The first processing unit 110a may include firmware performing the direct load/store operations described above.

Some of the components included in the processing unit 110C shown in FIG. 6 may be substantially the same as those of the processing unit 110A shown in FIG. 4. For convenience of description, like components may be denoted by like reference numerals, and may not repeatedly described.

The first processing unit 110a (HCPU) may include at least one host processor 112a and at least one TCM 114. The first processing unit 110a may process various signals transmitted/received to/from the host 20. The second processing unit 110b may include at least one processor 112b (FCPU) and at least one TCM 114. The second processing unit 110b may process various signals transmitted/received to/from the storage medium 200.

Figure 7:
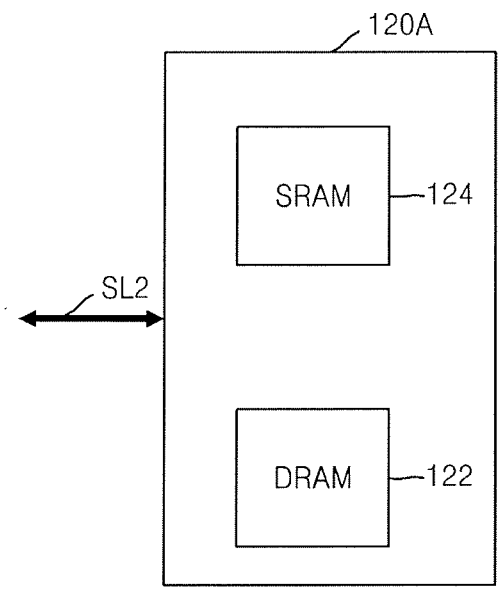
FIG. 7 is a block diagram of at least one memory included in the controller of FIG. 2 according to an exemplary embodiment of the present inventive concept.

FIG. 7 is a block diagram of an example of at least one memory 120A included in the controller 100A of FIG. 2 according to an exemplary embodiment of the present inventive concept.

Referring to FIGS. 1 and 7, the at least one memory 120A may include a first memory 122 and a second memory 124. However, exemplary embodiments of the present inventive concept are not limited thereto. For example, the at least one memory 120A may include three or more memories.

The first memory 122 may temporarily store raw data read from the storage medium 200 or raw data received from the host 20. The raw data may be stored in a page unit, and may be referred to as page data. In an exemplary embodiment, the first memory 122 may be a dynamic RAM (DRAM). For example, the first memory 122 may be a DRAM of 4 MB, and accordingly, if a page has a size of 4 KB, the first memory 122 may store 1024 pages. However, the sizes of the first memory 122 and the page are not limited thereto.

The second memory 124 may temporarily store metadata of the raw data that is temporarily stored in the first memory 122. The metadata may be information relating to the pages, and may be referred to as page information. The page information may include, for example, DRAM related information, bitmap information, page to logical block address (LBA) mapping information, or partition information. In an exemplary embodiment, the second memory 124 may be a static RAM (SRAM), for example, an SRAM of 128 KB. However, the size of the second memory 124 is not limited thereto.

Figure 8:
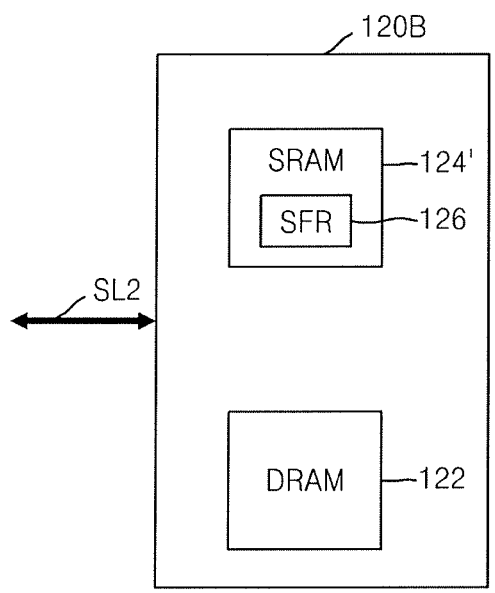
FIG. 8 is a block diagram of an example of the at least one memory included in the controller of FIG. 2 according to an exemplary embodiment of the present inventive concept.

FIG. 8 is a block diagram of another example of the at least one memory 120B included in the controller 100A of FIG. 2 according to an exemplary embodiment of the present inventive concept.

Referring to FIG. 8, the at least one memory 120B may include the first memory 122 and a second memory 124'. The second memory 124' may include at least one SFR 126. The at least one SFR 126 may be used to perform the direct load operation or the direct store operation described above. In an exemplary embodiment, the first memory 122 may include at least one SFR.

Figure 9:
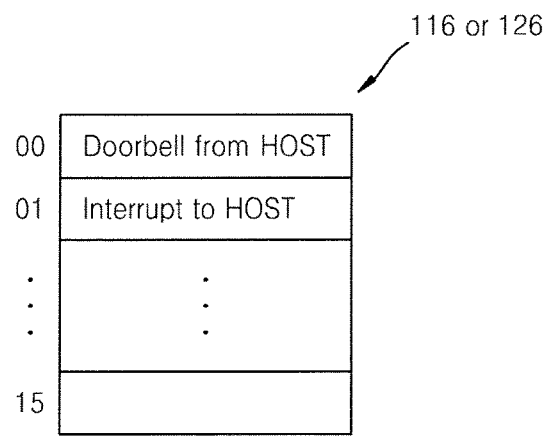
FIG. 9 is a block diagram of a special function register (SFR) included in the processing unit of FIG. 5 or the memory of FIG. 8 according to exemplary embodiments of the present inventive concept.

FIG. 9 is a block diagram showing an example of the SFR 116 or 126 included in the processing unit 110B of FIG. 5 or the at least one memory 120B of FIG. 8 according to an exemplary embodiment of the present inventive concept.

Referring to FIGS. 1 and 9, the at least one SFR 116 or 126 may include 16 SFRs. However, exemplary embodiments are not limited thereto. A first SFR may store, for example, the doorbell transferred from the host 20. The doorbell is a flag representing initiation of the direct load operation or the direct store information described above. A second SFR may store an interrupt to be transferred to the host 20.

Figure 10:
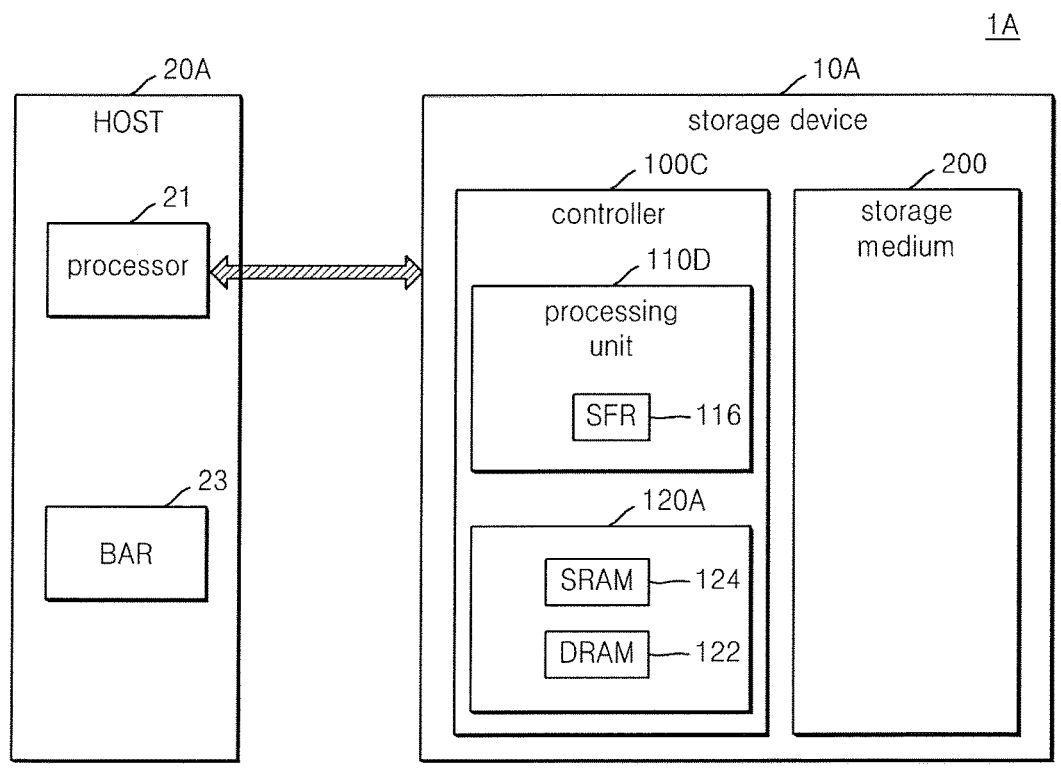
FIG. 10 is a block diagram of a computing system according to an exemplary embodiment of the present inventive concept.

FIG. 10 is a block diagram of a computing system 1A according to an exemplary embodiment of the present inventive concept.

Referring to FIG. 10, the computing system 1A may include a host 20A and a storage device 10A. The host 20A may include a processor 21 and a plurality of base address registers (BARs) 23. At least one of the plurality of BARs 23 may store a first address map AM1.

The plurality of BARs 23 are registers in which base address values are stored when executing a program. An absolute address may be found by adding a relative address value to the base address value. For example, the host 20A may include six BARs (e.g., BAR0 through BAR5), and BAR4 and BAR5 from among the six BARs may store addresses allocated with respect to the memories included in the storage device 10A. However, the number of BARs is not limited thereto.

The storage device 10A may include a controller 100C and the storage medium 200. The controller 100C may include a processing unit 110D and a memory 120A. The processing unit 110D may include at least one SFR 116. The memory 120A may include, for example, the DRAM 122 and the SRAM 124 shown in FIG. 7.

Figure 11:
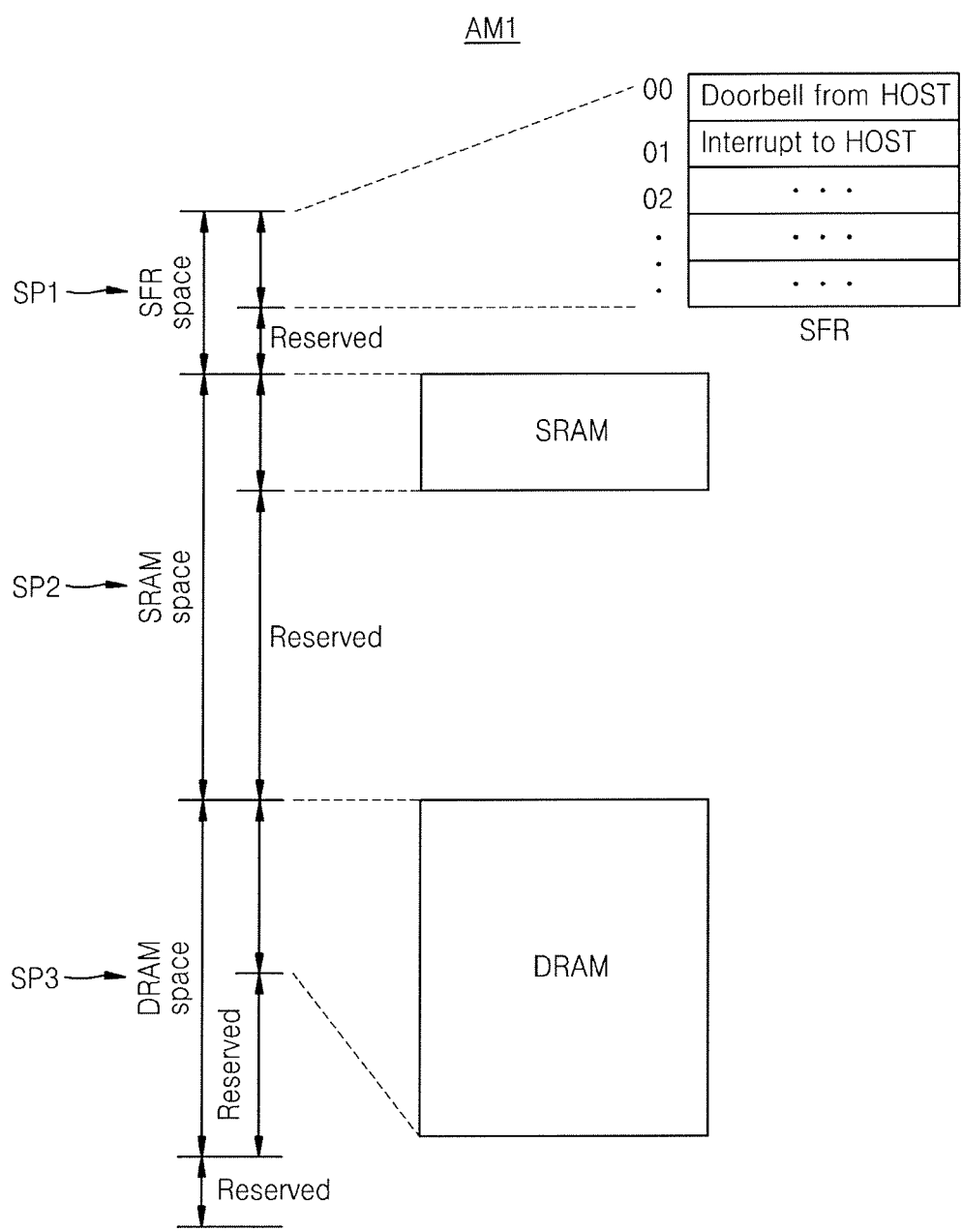
FIG. 11 is a diagram showing an example of an address map of memories included in a controller of FIG. 10 according to an exemplary embodiment of the present inventive concept.

FIG. 11 is a diagram showing an example of an address map AM1 of the memories included in the controller 100C of FIG. 10 according to an exemplary embodiment of the present inventive concept.

Referring to FIGS. 10 and 11, a first address map AM1 includes an SFR space SP1, an SRAM space SP2, and a DRAM space SP3. The SFR space SP1, the SRAM space SP2, and the DRAM space SP3 may not overlap with each other (e.g., the spaces may be allocated exclusively from each other). The processor 21 may directly access the SFR 116, the SRAM 124, and the DRAM 122 included in the storage device 10A with reference to the first address map AM1.

The first address map AM1 is an address space that is allocated to the memories that the processor 21 may access.

The first address map AM1 may be stored in the host 20A, and the processor 21 may access the memories with reference to the first address map AM1. The first address map AM1 shown in FIG. 11 only shows the address spaces that are allocated to the memories included in the storage device 10A from among the entire address maps included in the host 20A. The first address map AM1 may be configurable, and may be programmed if necessary.

Figure 12:
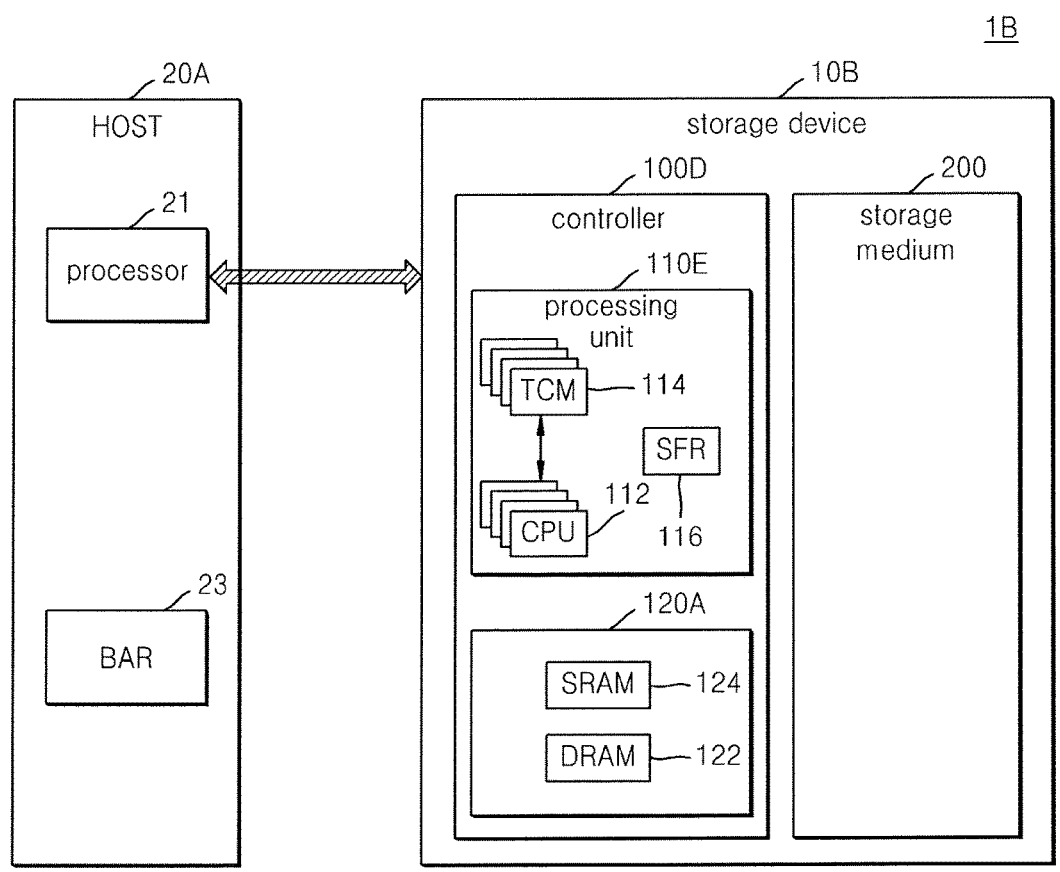
FIG. 12 is a block diagram of a computing system according to an exemplary embodiment of the present inventive concept.

FIG. 12 is a block diagram of a computing system 1B according to an exemplary embodiment of the present inventive concept.

Referring to FIG. 12, the computing system 1B may include a host 20A and a storage device 10B. The host 20A may include the processor 21 and the plurality of BARs 23. At least one of the plurality of BARs 23 may store a second address map AM2.

The plurality of BARs 23 are registers in which base address values are stored when executing a program. An absolute address may be found by adding a relative address value to the base address value. For example, the host 20A may include six BARs 23 (e.g., BAR0 through BAR5), and BAR5 from among the six BARs 23 may store the address spaces allocated to the memories included in the storage device 10B.

The storage device 10B may include a controller 100D and the storage medium 200. The controller 100D may include a processing unit 110E and the memory 120A. The processing unit 110E may include at least one processor 112, at least one TCM 114, and at least one SFR 116. The memory 120A may include the DRAM 122 and the SRAM 124.

Figure 13:
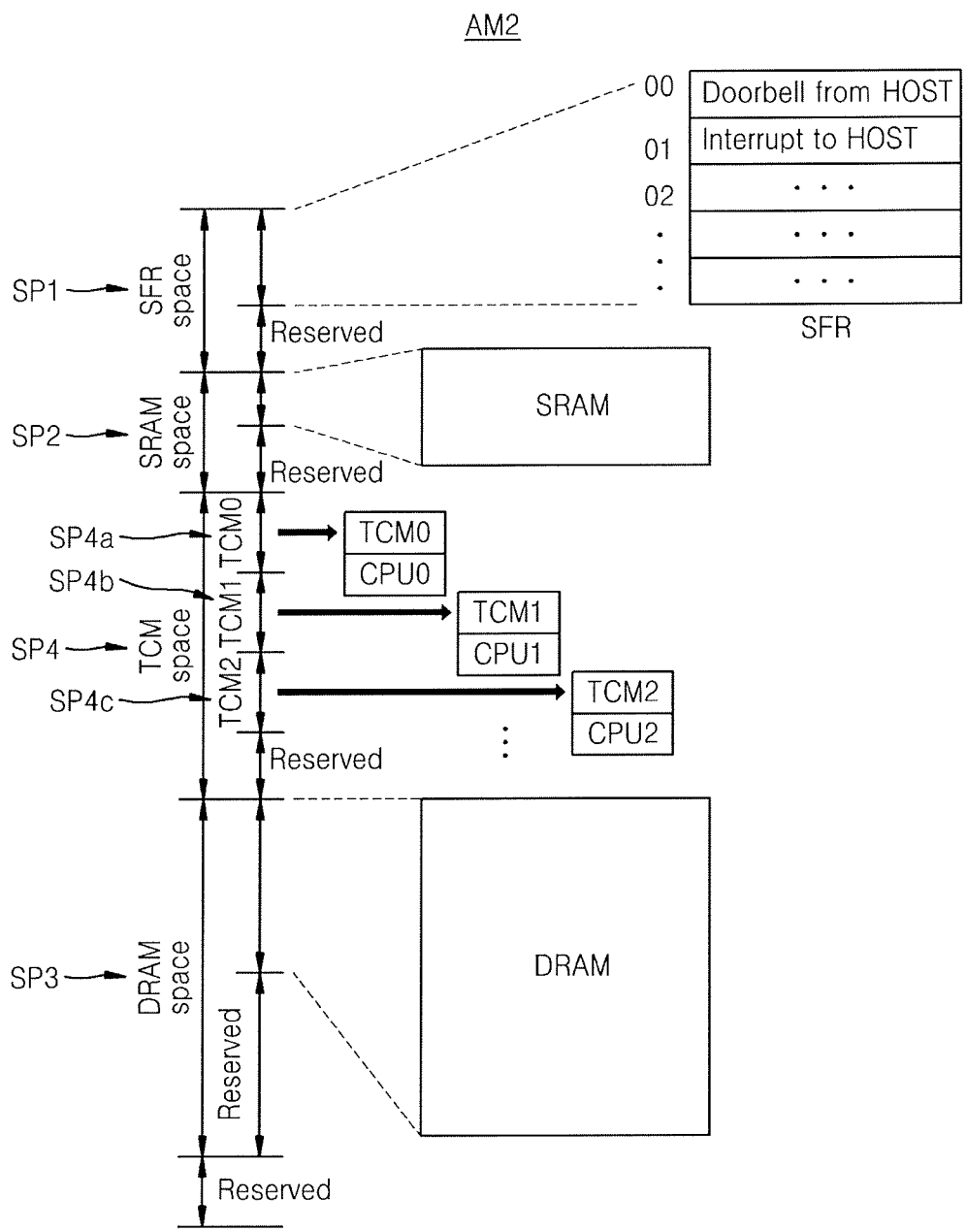
FIG. 13 is a diagram showing an example of an address map of memories included in a controller of FIG. 12 according to an exemplary embodiment of the present inventive concept.

FIG. 13 is a diagram showing an example of an address map AM2 of the memories included in the controller 100D of FIG. 12 according to an exemplary embodiment of the present inventive concept.

Referring to FIGS. 12 and 13, the second address map AM2 may include an SFR space SP1, an SRAM space SP2, a DRAM space SP3, and a TCM space SP4. Thus, when compared with the first address map AM1 shown in FIG. 11, the second address map AM2 may further include the TCM space SP4. For convenience of description, the above description relating to FIG. 11 that applies to FIG. 13 may be omitted herein.

The SFR space SP1, the SRAM space SP2, the DRAM space SP3, and the TCM space SP4 may not overlap with each other. For example, these spaces may be allocated exclusively from each other. The processor 21 may directly access the SFR 116, the SRAM 124, the DRAM 122, and the TCM 114 included in the storage device 10B with reference to the second address map AM2.

The TCM space SP4 may include a first TCM space SP4*a*, a second TCM space SP4*b*, and a third TCM space SP4*c*. The TCM space SP4 may further include TCM spaces allocated respectively to other TCMs. Thus, the number of sub-spaces included in the TCM space SP4 is not limited to three.

The first TCM space SP4*a* is an address space allocated to a first TCM (TCM0) that is connected to a first processor CPU0 via a dedicated channel, the second TCM space SP4*b* is an address space allocated to the second TCM (TCM1) that is connected to a second processor CPU1 via a dedicated channel, and a third TCM space SP4*c* is an address space allocated to a third TCM (TCM2) that is connected to a third processor CPU2 via a dedicated channel.

As described above, the TCM space SP4 may be divided into a plurality of sub-spaces (e.g., SP4*a*, SP4*b*, and SP4*c*) according to the number of the plurality of TCMs included in the processing unit 110E. The plurality of sub-spaces (e.g., SP4a, SP4b, and SP4c) may not overlap with each other and may be allocated exclusively from each other.

Figure 14:
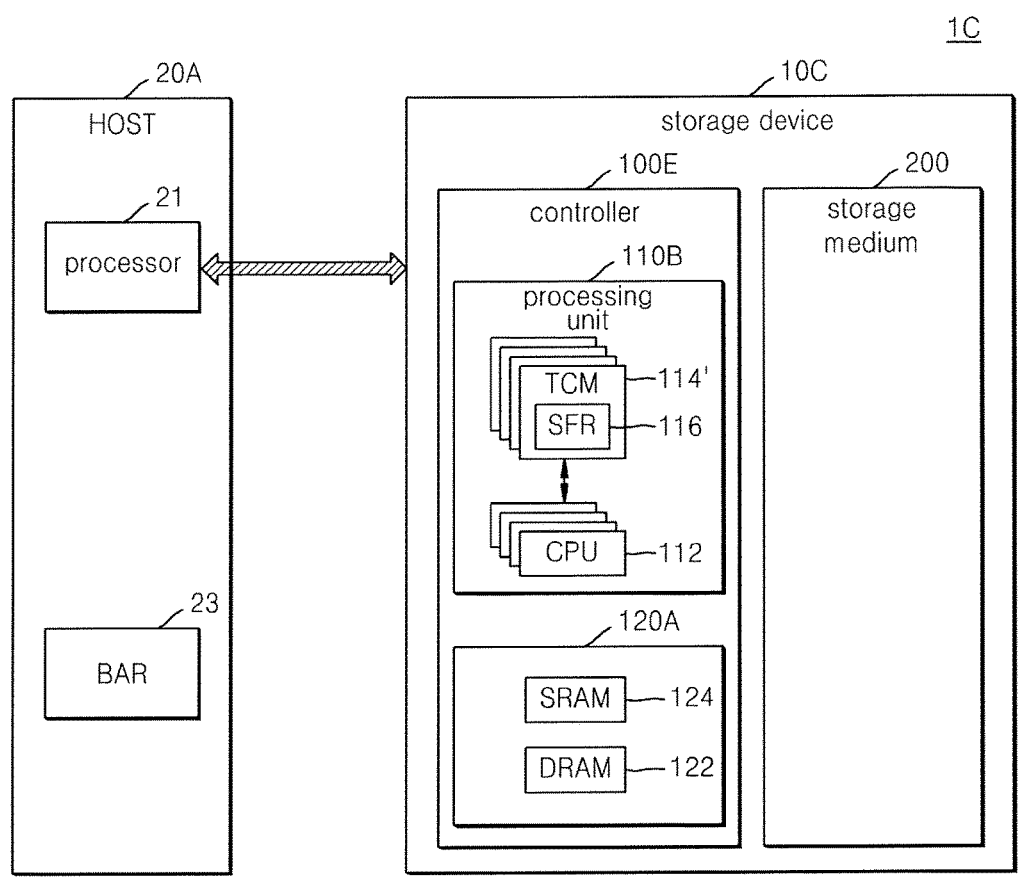
FIG. 14 is a block diagram of a computing system according to an exemplary embodiment of the present inventive concept.

FIG. 14 is a block diagram of a computing system 1C according to an exemplary embodiment of the present inventive concept.

Referring to FIG. 14, the computing system 1C may include the host 20A and a storage device 10C. The host 20A may include the processor 21 and the plurality of BARs 23. At least one of the plurality of BARs 23 may store an address map AM3.

The plurality of BARs 23 are registers in which base address values are stored when executing a program. An absolute address may be found by adding a relative address value to the base address value. For example, the host 20A may include six BARs 23 (e.g., BAR0 through BAR5), and BAR5 from among the six BARs 23 may store the address spaces allocated to the memories included in the storage device 10C.

The storage device 10C may include a controller 100E and the storage medium 200. The controller 100E may include the processing unit 110B and the memory 120A. The processing unit 110B may include at least one processor 112 and at least one TCM 114'. The at least one TCM 114' may include at least one SFR 116. The memory 120A may include the DRAM 122 and the SRAM 124.

Figure 15:
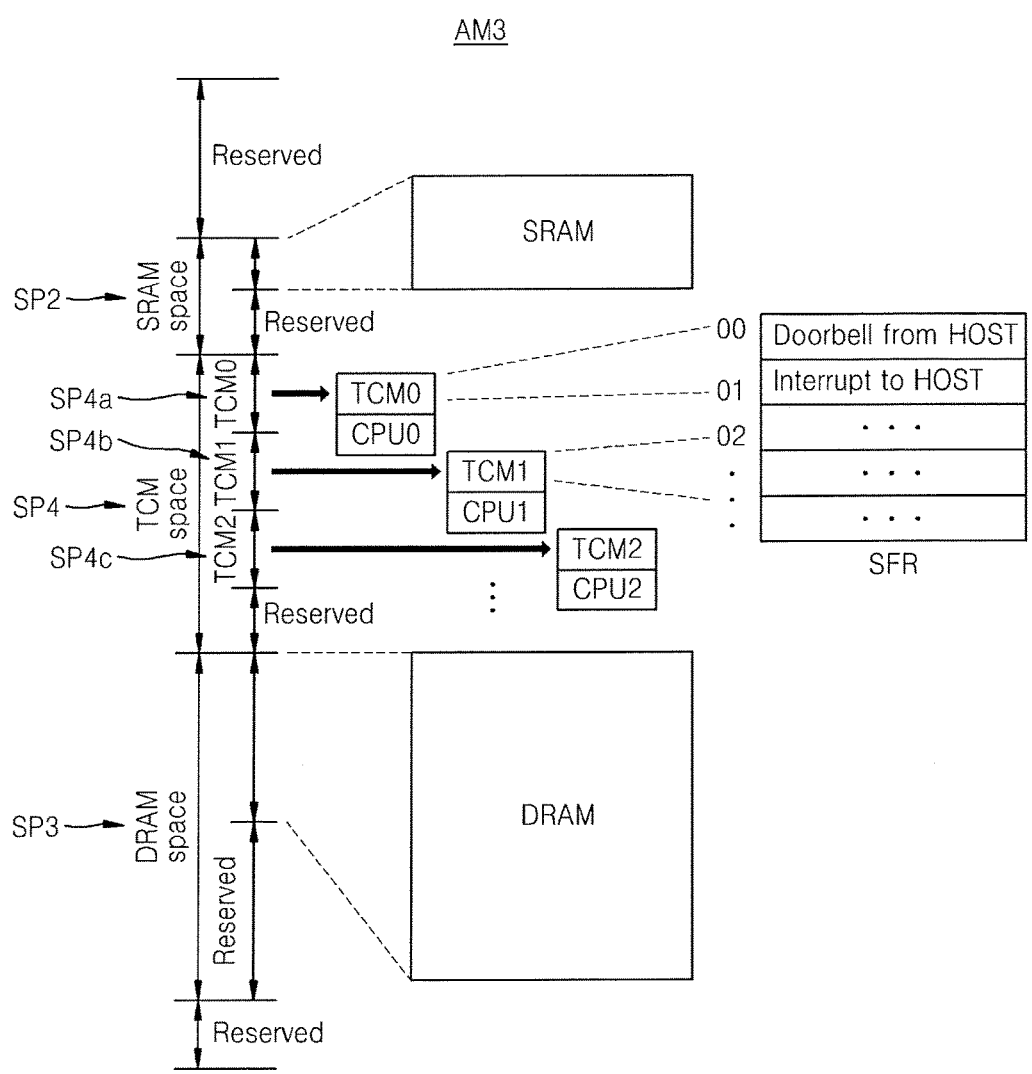
FIG. 15 is a diagram showing an example of an address map of memories included in a controller of FIG. 14 according to an exemplary embodiment of the present inventive concept.

FIG. 15 is a diagram showing an example of an address map AM3 of the memories included in the controller 100E of FIG. 14 according to an exemplary embodiment of the present inventive concept.

Referring to FIGS. 14 and 15, the third address map AM3 may include the SRAM space SP2, the DRAM space SP3, and the TCM space SP4. For convenience of description, the above descriptions with reference to FIGS. 10 through 13 may be applied to FIG. 15, and thus, may be omitted herein.

The SRAM space SP2, the DRAM space SP3, and the TCM space SP4 may not overlap with each other and may be allocated exclusively from each other. The processor 21 may directly access the SRAM 124, the DRAM 122, the TCM 114', and the SFR 116 included in the storage device 10C with reference to the third address map AM3.

The TCM space SP4 may be divided into a plurality of sub-spaces including, for example, the first TCM space SP4a, the second TCM space SP4b, and the third TCM space SP4c. At least one of the plurality of sub-spaces, for example, the first TCM space SP4a, may be partially allocated as an SFR space. The number of sub-spaces of the TCM space SP4 is not limited thereto.

Figure 16:
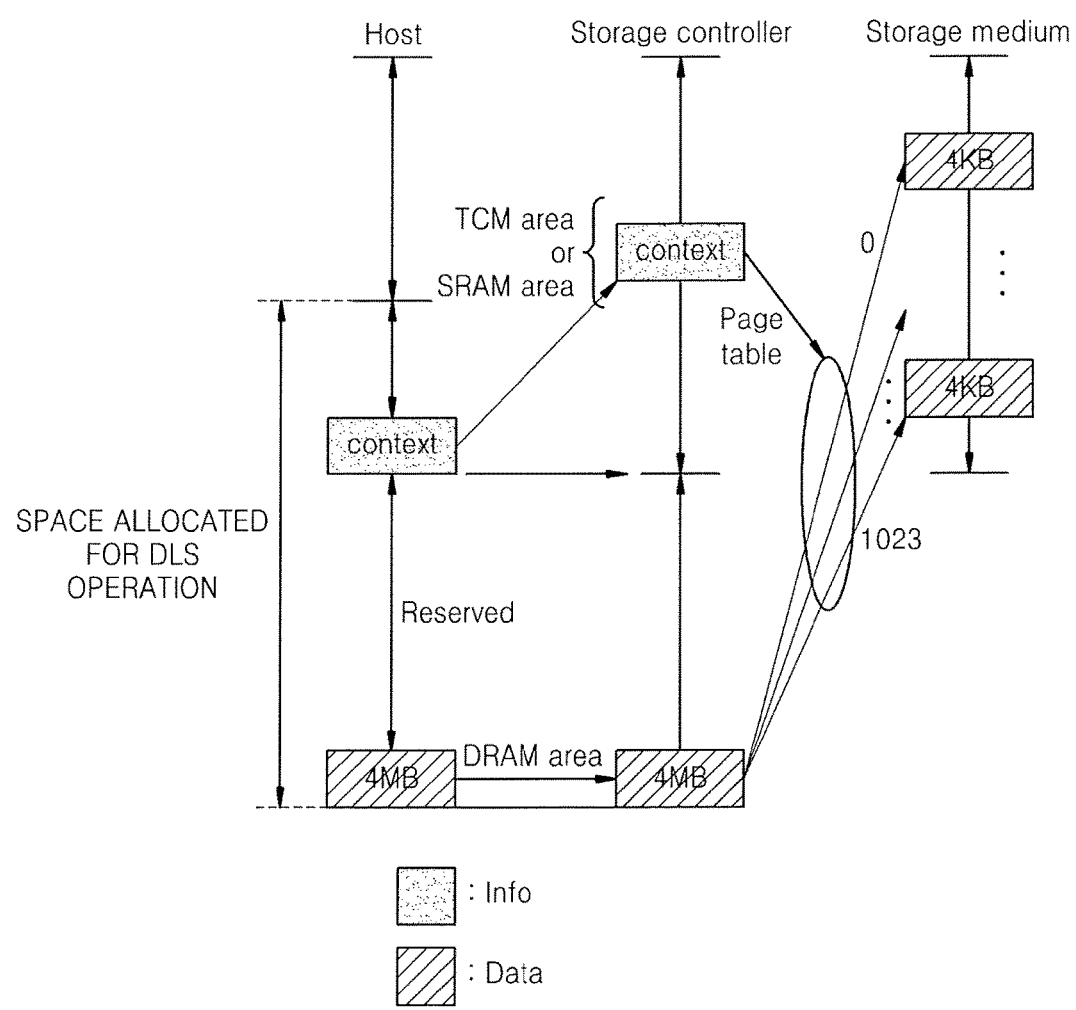
FIG. 16 is a diagram showing an example of an address map used in the computing system of FIG. 1 according to an exemplary embodiment of the present inventive concept.

FIG. 16 is a diagram of an address map used in the computing system 1 of FIG. 1 according to an exemplary embodiment of the present inventive concept.

Referring to FIG. 16, a part of the address map relating to the memories that the host 20 may access may be allocated for performing the direct load/store operations described above. The allocated space for the direct load/store operations may be stored in the host 20. For example, the allocated space for the direct load/store operations may be stored in BAR4 and BAR5.

Context of the host 20 may have, for example, logical block addressing (LBA) information. The context of the host 20 may be mapped to the TCM space or the SRAM space of the controller 100. The data may be mapped with the DRAM space of the controller 100. The data mapped with the DRAM space may be mapped with the storage medium 200 using a page table stored in the TCM space or the SRAM space.

Figure 17:
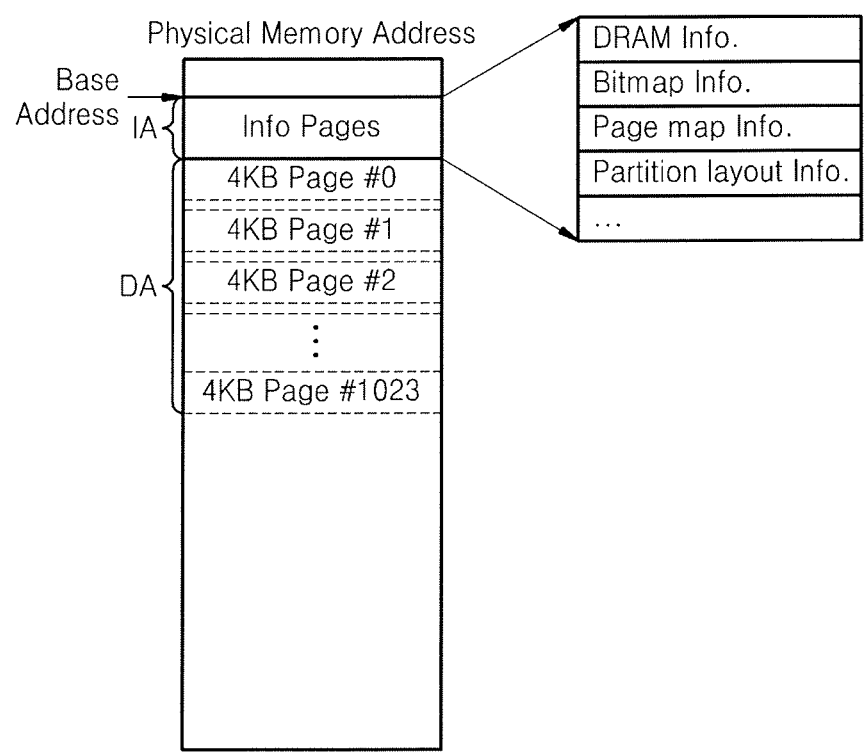
FIG. 17 is a diagram of at least one memory included in the controller of FIG. 2 according to an exemplary embodiment of the present inventive concept.

FIG. 17 is a diagram of an example of the at least one memory 120 included in the controller 100A of FIG. 2 according to an exemplary embodiment of the present inventive concept.

Referring to FIG. 17, the at least one memory 120 may be, for example, a DRAM that may be classified as a data area DA including a plurality of data pages and an information area IA including info pages representing information about the data pages.

A size of each of the data pages may be, for example, 4 KB, and the DRAM may include, for example, 1024 pages. Accordingly, the data area DA may have a capacity of about 4 MB. The information area IA may be about 14 KB. The information area IA may include, for example, a table representing DRAM information, bitmap information, page map information, and partition layout information. The size of the data pages, the data area DA and the information area IA are not limited thereto.

Figure 18:
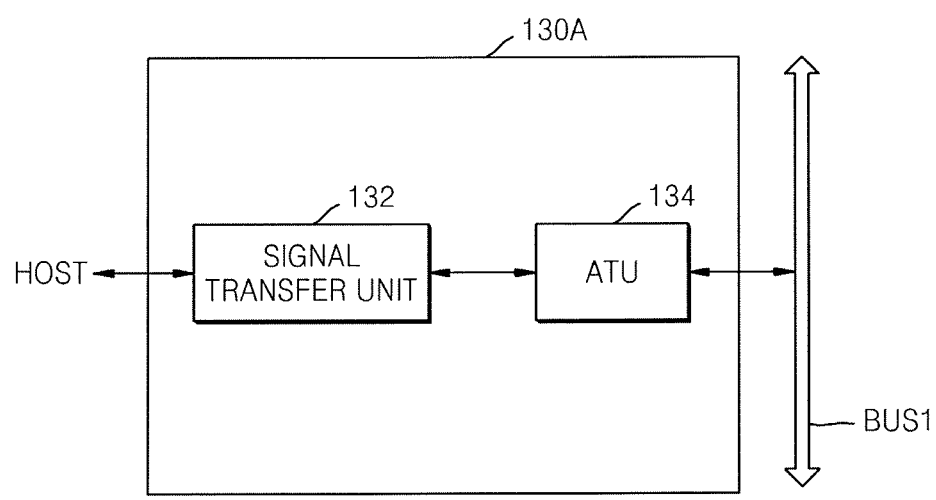
FIG. 18 is a block diagram of an interface unit included in the controller of FIG. 2 according to an exemplary embodiment of the present inventive concept.

FIG. 18 is a block diagram of an example of an interface unit 130A included in the controller 100A of FIG. 2 according to an exemplary embodiment of the present inventive concept.

Referring to FIG. 18, the interface unit 130A may include a signal transfer unit 132 and an address conversion unit 134. The interface unit 130A may further include a buffer memory (e.g., an SRAM).

The signal transfer unit 132 may transmit/receive a signal to/from the host 20. In an exemplary embodiment, the interface unit 130A may interface with the host 20 according to PCIe, and the signal transfer unit 132 may receive a signal from the host 20 via a PCIe bus and may provide the signal with electrical and mechanical interfacing. However, the interface type is not limited to PCIe, and may include other standardized interfaces, as described above. The signal transfer unit 132 may transfer a signal generated by the controller 100A to the host 20 via the PCIe bus, and may provide the signal that is to be transferred via the electrical and mechanical interfacing.

The signal transfer unit 132 may be formed of, for example, a physical layer (PHY), and may be referred to as a PHY core. The signal transfer unit 132 may be referred to as a port.

The address conversion unit 134 may perform address conversion between a host address space and a controller address space. For example, the address conversion unit 134 may convert an external address ADDR_EX of the signal received from the host 20 to an internal address $ADDR_{13}$ IN that is suitable for internal communication within the controller 100A. The address conversion unit 134 may convert the internal address ADDR_IN to the external address ADDR_EX. Operations of the address conversion unit 134 will be described with reference to FIG. 20.

Figure 19:
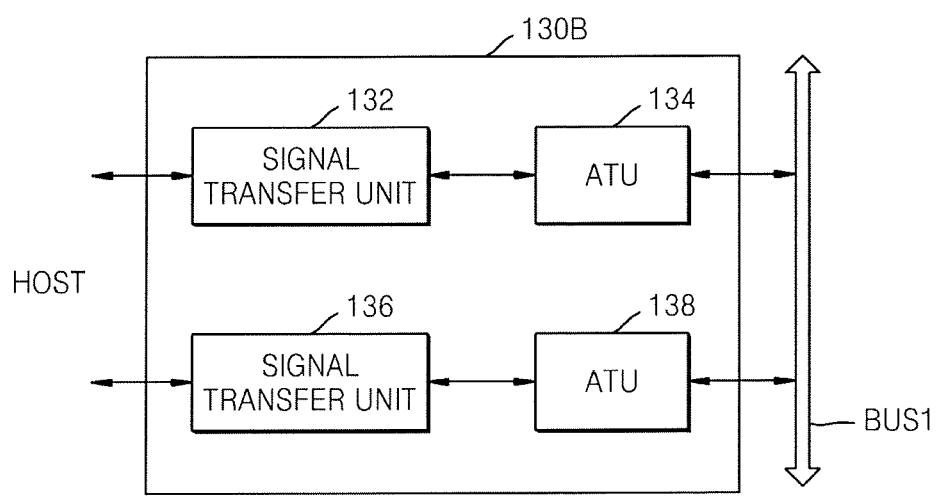
FIG. 19 is a block diagram of an example of the interface unit included in the controller of FIG. 2 according to an exemplary embodiment of the present inventive concept.

FIG. 19 is a block diagram of another example of the interface unit 130B included in the controller 100A of FIG. 2 according to an exemplary embodiment of the present inventive concept.

Referring to FIG. 19, the interface unit 130B may include a plurality of signal transfer units including, for example, a first signal transfer unit 132 and a second signal transfer unit 136, and a plurality of address conversion units including, for example, a first address conversion unit 134 and a second address conversion unit 138. However, exemplary embodiments are not limited thereto. For example, the interface unit 130B may include three or more signal transfer units and three or more address conversion units. The interface unit 130B may further include a buffer memory (e.g., an SRAM).

The first and second signal transfer units 132 and 136 may transmit/receive signals to/from the host 20, respectively. The first and second signal transfer units 132 and 136 may be implemented as separate ports to process the signals in parallel. As a result, a high speed access operation between the host 20 and the storage device 10 may be implemented.

Figure 20:
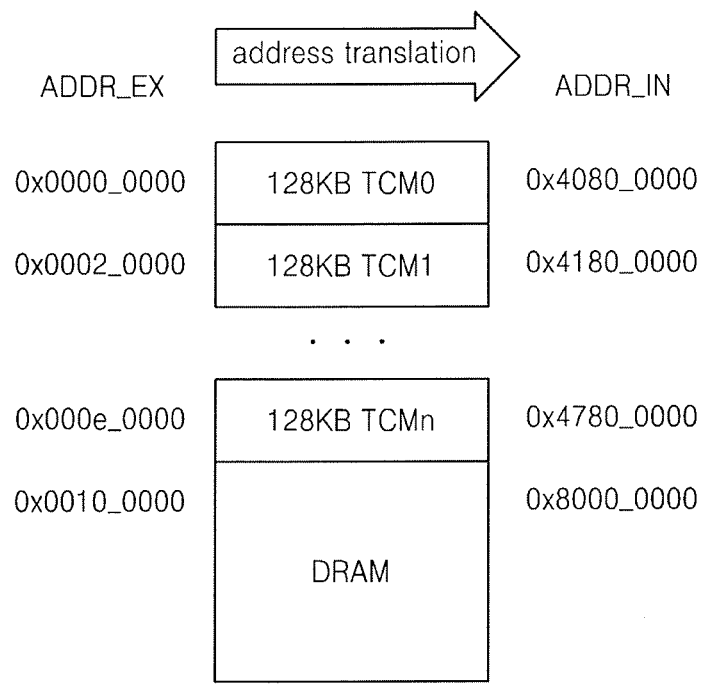
FIG. 20 is a diagram illustrating an operation of an address conversion unit included in the interface unit of FIG. 18 according to an exemplary embodiment of the present inventive concept.

FIG. 20 is a diagram of an operation of the address conversion unit 134 included in the interface unit 130A of FIG. 18 according to an exemplary embodiment of the present inventive concept.

Referring to FIG. 20, the address conversion unit 134 may perform address conversion between the host address space and the controller address space. The address of the host address space is the external address ADDR_EX, and the address of the controller address space is the internal address ADDR_IN.

The external address ADDR_EX is a standard interface between the host 20 and the storage device 10, for example, an address according to the PCIe standard, and may be referred to as a host address. However, the standard interface is not limited to PCIe. The external address ADDR_EX may be, for example, 64 bits, however the size of the external address ADDR_EX is not limited thereto. The internal address ADDR_IN is suitable for the internal communication in the controller 100A, and may be referred to as a controller address. The internal address ADDR_IN may be, for example, 32 bits, however the size of the internal address ADDR_IN is not limited thereto.

The address conversion unit 134 may convert the external address ADDR_EX of the first TCM (TCM0), 0x0000_0000, to the internal address ADDR_IN 0x4080_0000. Further, the address conversion unit 134 may convert the external address ADDR_EX of the DRAM, 0x000e_0000, to the internal address ADDR_IN 0x4780_0000.

Figure 21:
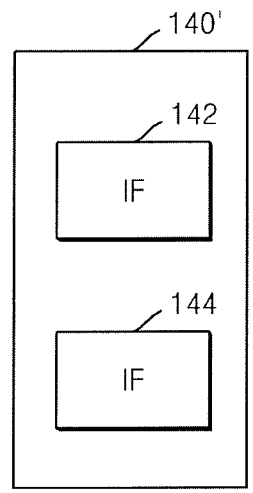
FIG. 21 is a block diagram of a second interface unit included in the controller of FIG. 3 according to an exemplary embodiment of the present inventive concept.

FIG. 21 is a block diagram of an example of the second interface unit 140' included in the controller 100B of FIG. 3 according to an exemplary embodiment of the present inventive concept.

Referring to FIG. 21, the second interface unit 140' may interface with the first interface unit 130. The second interface unit 140' may include a plurality of sub-interface units 142 and 144. Although the second interface unit 140' shown in FIG. 21 includes first and second sub-interface units 142 and 144, exemplary embodiments are not limited thereto. For example, the second interface unit 140' may include three or more sub-interface units.

The second interface unit 140' may selectively activate one of the plurality of sub-interface units 142 and 144 to interface with the first interface unit 130. The second interface unit 140' may further include a plurality of multiplexers and a plurality of demultiplexers, and may selectively activate one of the plurality of sub-interface units 142 and 144 according to a selection signal applied from an external source.

In an exemplary embodiment, the first sub-interface unit 142 may interface with the first interface unit 130 according to SCSIe, and the second sub-interface unit 144 may interface with the first interface unit 130 according to NVMe. However, exemplary embodiments are not limited thereto. For example, the first and second sub-interface units 142 and 144 may interface with the first interface unit 130 according to other standardized interfaces.

The second interface unit 140' may further include a buffer memory (e.g., an SRAM), and the first and second sub-interface units 142 and 144 may share the buffer memory. The second interface unit 140' may further include a bus for communication between the first and second sub-interface units 142 and 144 and the buffer memory.

Figure 22:
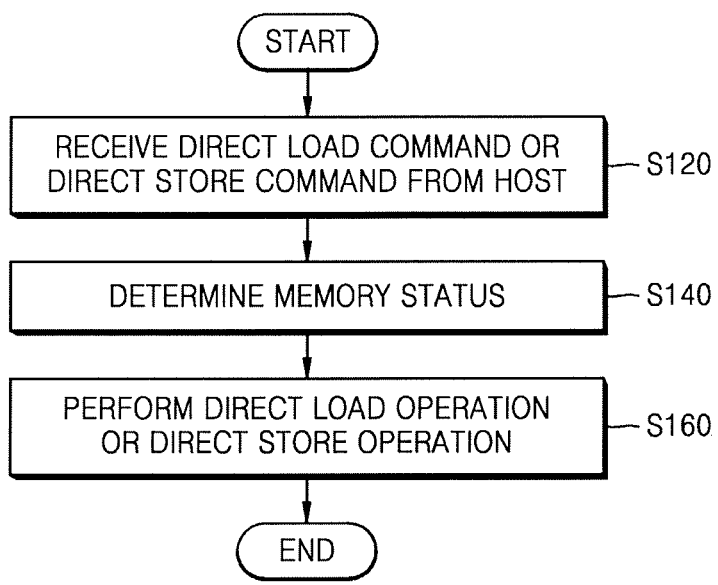
FIG. 22 is a flowchart illustrating a method of operating a storage device according to an exemplary embodiment of the present inventive concept.

FIG. 22 is a flowchart illustrating a method of operating a storage device according to an exemplary embodiment of the present inventive concept.

Referring to FIG. 22, a method of operating a storage device according to an exemplary embodiment is a method of directly accessing the memories included in the storage device by the host. The method described with reference to FIG. 22 may be implemented according to the exemplary embodiments described above with reference to FIGS. 1 through 21. Hereinafter, the method of operating the storage device according to an exemplary embodiment will be described with reference to FIGS. 1, 2 and 22.

In operation S120, a storage device may receive a direct load command or a direct store command from a host. For example, the storage device 10 may receive the direct load command or the direct store command from the host 20. The direct load command causes a direct load operation to be performed, and the direct store command causes a direct store operation to be performed. For example, the direct load command instructs the storage device 10 to perform a direct load operation, and the direct store command instructs the storage device 10 to perform a direct store operation.

In operation S140, a status of the memory is determined. For example, the processing unit 110 may determine a status of the at least one memory 120. For example, the processing unit 110 determines whether the at least one memory 120 is in a status suitable for executing the direct load operation or the direct store operation.

In operation S160, the direct load operation or the direct store operation is performed. For example, data that is temporarily stored in the at least one memory 120 is loaded to the host 20 or data received from the host 20 is temporarily stored in the at least one memory 120 based on a determination result to perform the direct load operation or the direct store operation between the host 20 and the at least one memory 120.

Figure 23:
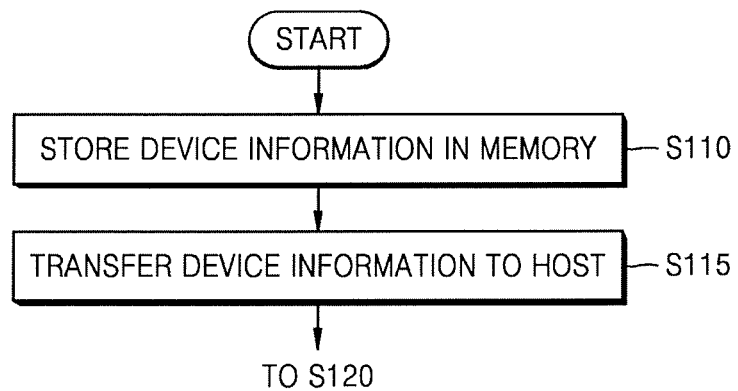
FIG. 23 is a flowchart illustrating a method of operating a storage device according to an exemplary embodiment of the present inventive concept.

FIG. 23 is a flowchart illustrating a method of operating a storage device according to an exemplary embodiment of the present inventive concept.

Referring to FIG. 23, the method of operating the storage device 10 according to an exemplary embodiment is an initialization method for performing the direct load/store operations, and may be performed before operation S120 shown in FIG. 22. The initialization method of FIG. 23 may be performed to allow the host to recognize a hardware configuration of the storage device to perform the direct load/store operations. The method described with reference to FIG. 23 may be implemented according to the exemplary embodiments described above with reference to FIGS. 1 through 22. Hereinafter, the method of operating the storage device according to an exemplary embodiment will be described with reference to FIGS. 1, 2, 22 and 23.

In operation S110, device information is stored in a memory. The device information may include, for example, DRAM information, DRAM capacity, DRAM version, a page size, the number of information pages, the number of data pages, an LBA size, start LBA, end LBA, bitmap offset, page map table offset, partition layout offset, and padding.

Figure 24:
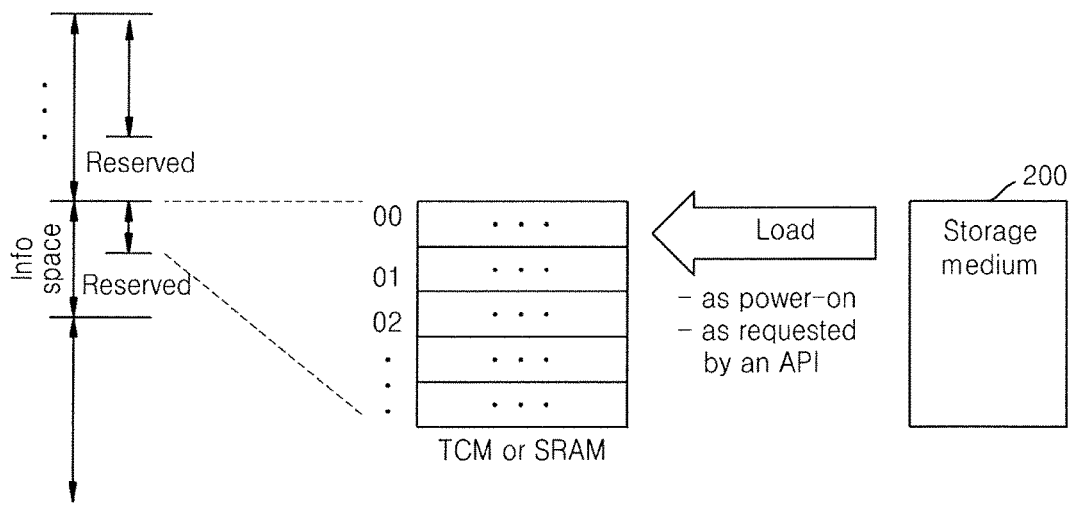
FIG. 24 is a schematic diagram illustrating an example of operation S110 of FIG. 23 according to an exemplary embodiment of the present inventive concept.

FIG. 24 is a schematic diagram showing an example of operation S110 of FIG. 23 according to an exemplary embodiment of the present inventive concept.

Referring to FIG. 24, device information may be loaded from the storage medium 200 to the memory 120 according to an operation initiating signal (e.g., a power-on signal) or an initialization command. The device information may be stored in a certain region of the storage medium 200 that is known to a host driver or firmware in advance or is pre-compromised. The certain region storing the device information in the storage medium 200 may be, for example, a base address or an address divided by a certain offset.

The device information stored in the storage medium 200 may be transferred or copied to the information area IA (see FIG. 17) in the memory 120. In an exemplary embodiment, the device information stored in the storage medium 200 may be transferred or copied to the DRAM 122 or the SRAM 124 of FIG. 7 or FIG. 8. In an exemplary embodiment, the device information stored in the storage medium 200 may be transferred or copied to the TCM 114 of FIGS. 4 through 6. In an exemplary embodiment, the device information stored in the storage medium 200 may be transferred or copied to the SFR 116 of FIG. 5 or the SFR 126 of FIG. 8.

The information area IA in the memory 120 is allocated as an exclusive area in the address map, and may be a pre-compromised area with the host driver or the firmware. The device information copied from the storage medium 200 may have a default value, which may be changed by an explicit command generated by the host 20.

Figure 25:
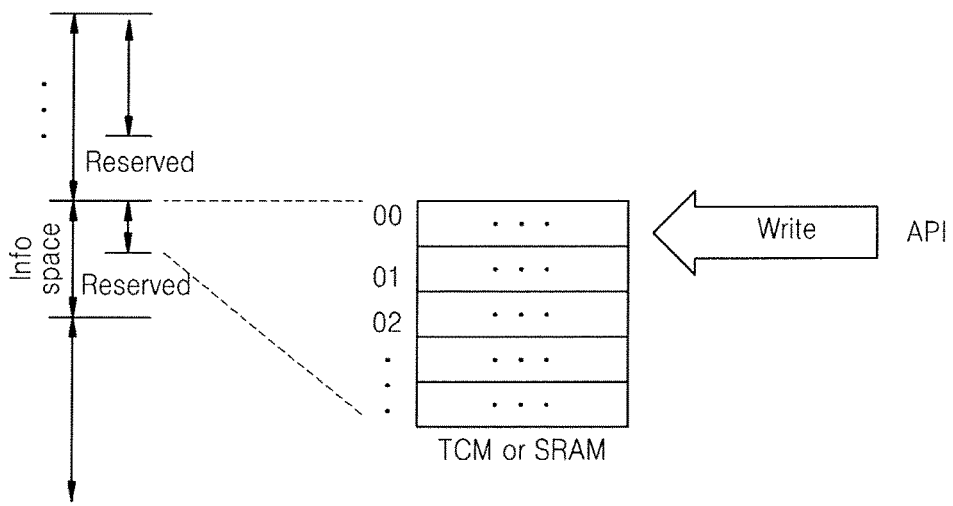
FIG. 25 is a schematic diagram illustrating an example of operation S110 of FIG. 23 according to an exemplary embodiment of the present inventive concept.

FIG. 25 is a schematic diagram of another example of operation S110 shown in FIG. 23 according to an exemplary embodiment of the present inventive concept.

Referring to FIG. 25, in an exemplary embodiment of the present inventive concept, the host 20, for example, using an application protocol interface (API), may directly write device information in a certain address of the memory 120. The certain address of the memory 120 may be pre-compromised with the host driver or the firmware, and may correspond to the information area IA (see FIG. 17) in the memory 120. In an exemplary embodiment, the API may directly write the device information in the DRAM 122 or the SRAM 124 of FIG. 7 or FIG. 8. In an exemplary embodiment, the API may directly write the device information in the TCM 114/114' of FIGS. 4 through 6. In an exemplary embodiment, the API may directly write the device information in the SFR 116 of FIG. 5 or the SFR 126 of FIG. 8.

Referring back to FIG. 23, in operation S115, the device information is transferred to the host. For example, the controller 100 may transfer the device information to the host 20. As a result, the host 20 may recognize the hardware configuration of the storage device 10, and thus, may appropriately instruct the direct load/store operations to be performed.

Figure 26:
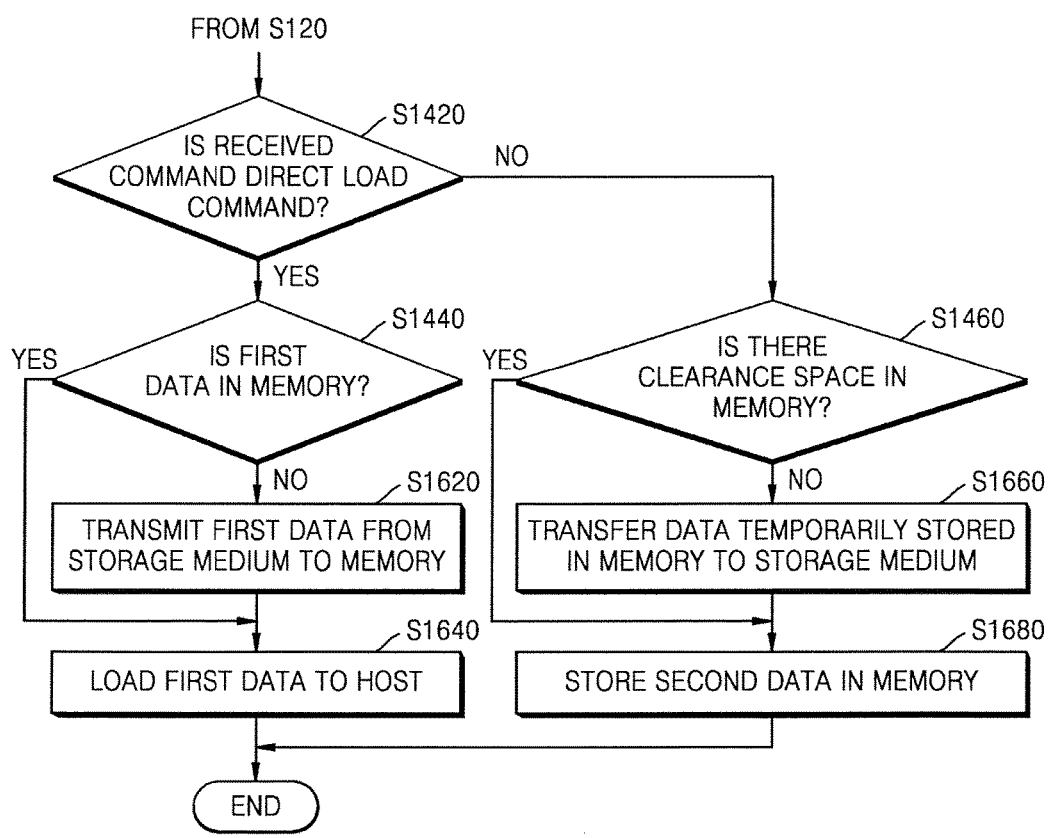
FIG. 26 is a flowchart illustrating a method of operating a storage device according to an exemplary embodiment of the present inventive concept.

FIG. 26 is a flowchart illustrating a method of operating a storage device according to an exemplary embodiment of the present inventive concept.

FIG. 26 illustrates operation S140 and operation S160 of FIG. 22 in further detail. The method described with reference to FIG. 26 may be implemented according to the exemplary embodiments described above with reference to FIGS. 1 through 25. Hereinafter, the method of operating the storage device according to an exemplary embodiment will be described with reference to FIGS. 1, 2 and 26.

In operation S1420, it is determined whether a received command is a direct load command. For example, the processing unit 110 may determine whether the command received from the host 20 is a direct load command. If the command is a direct load command, operation S1440 is performed. If the command is not a direct load command (e.g., if the command is a direct store command), operation S1460 is performed.

In operation S1440, it is determined whether there is first data in the memory. The first data is data corresponding to the direct load command and data that is to be loaded by the host 20. For example, the processing unit 110 or a memory manager may determine whether the first data is in the memory 120. If the first data is not in the memory 120, operation S1620 is performed. If the first data is in the memory 120, operation S1640 is performed.

In operation S1620, the first data is received from the storage medium to the memory 120. The above operations may be referred to as a fill operation. For example, the storage medium 200 may transfer or copy the first data to the memory 120, and then, the memory 120 may temporarily store the first data.

In operation S1640, the first data is loaded to the host. For example, the first data temporarily stored in the memory 120 may be loaded to the host 20. Thus, the execution of the direct load operation may be completed.

In operation S1460, it is determined whether there is a clearance space in the memory. The clearance space may store second data corresponding to the direct store command, the second data being the data that the host 20 is to store. For example, the processing unit 110 or the memory manager may determine whether the clearance space is in the memory 120. If the clearance space is not in the memory 120, operation S1660 is performed. If the clearance space is in the memory 120, operation S1680 is performed.

In operation S1660, the data temporarily stored in the memory is transferred to the storage medium. The above operations may be referred to as a flush operation. For example, the memory 120 may transfer the temporarily stored data to the storage medium 200, and the memory 120 may then ensure a clearance space.

In operation S1680, the second data may be stored in the memory. For example, the host 20 may store the second data in the memory 120, and execution of the direct store operation may be completed.

Figure 27:
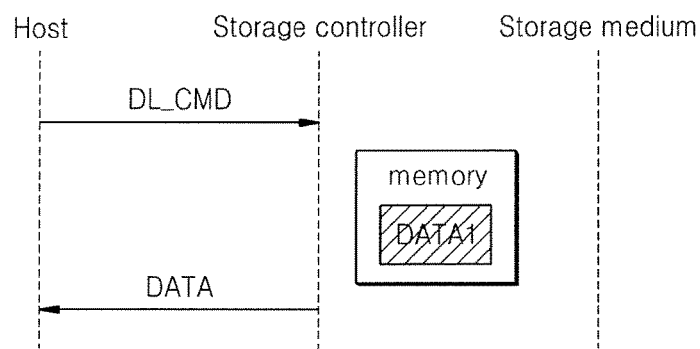
FIG. 27 is a schematic diagram showing a direct load operation according to an exemplary embodiment of the present inventive concept.

FIG. 27 is a schematic diagram of a direct load operation according to an exemplary embodiment of the present inventive concept.

Referring to FIG. 27, the direct load operation of an exemplary embodiment corresponds to executing the direct load command received from the host in a case in which there is available data in the memory of the storage device. Hereinafter, the direct load operation according to an exemplary embodiment will be described with reference to FIGS. 1 and 27.

First, the host 20 transmits a direct load command DL_CMD to the controller 100. The memory 120 of the controller 100 stores first data DATA1 corresponding to the direct load command DL_CMD (e.g., available data). Next, the controller 100 transfers the first data DATA1 to the host 20, and execution of the direct load operation may be completed.

Figure 28:
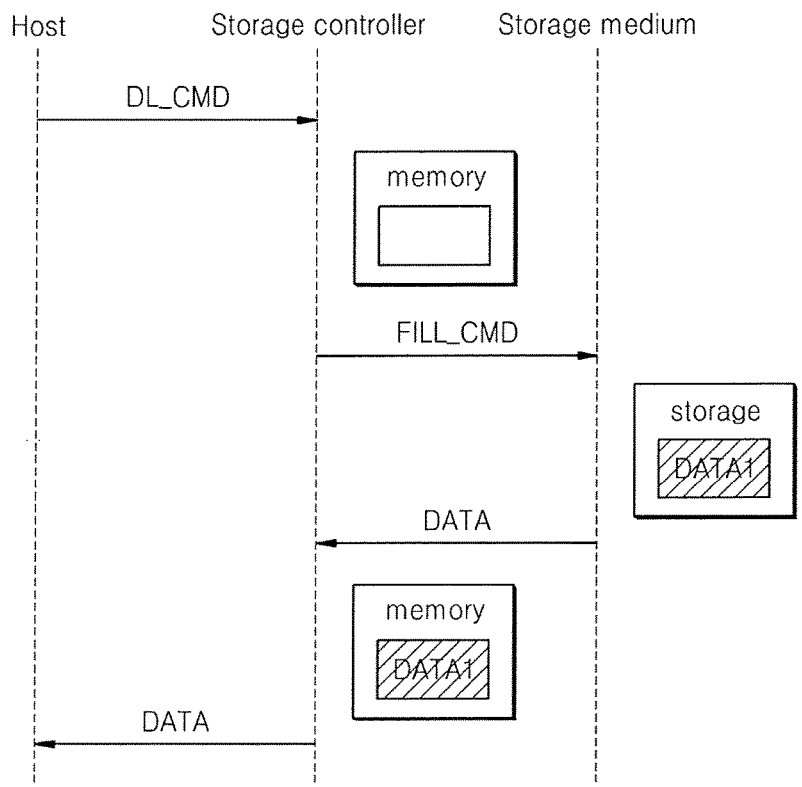
FIG. 28 is a schematic diagram showing a direct load operation according to an exemplary embodiment of the present inventive concept.

FIG. 28 is a schematic diagram of a direct load operation according to an exemplary embodiment of the present inventive concept.

Referring to FIG. 28, the direct load operation according to an exemplary embodiment corresponds to executing the direct load command received from the host in a case in which there is no available data in the memory of the storage device. Hereinafter, the direct load operation according to an exemplary embodiment will be described with reference to FIGS. 1 and 28.

First, the host 20 transmits a direct load command DL_CMD to the controller 100. The memory 120 of the controller 100 does not store the first data DATA1 corresponding to the direct load command DL_CMD (e.g., available data).

In addition, the controller 100 transmits a fill command FILL_CMD to the storage medium 200. The fill command FILL_CMD may be generated by the host 20. The storage medium 200 includes the first data DATA1 corresponding to the direct load command DL_CMD (e.g., the available data).

In addition, the storage medium 200 transfers or copies the first data DATA1 to the controller 100. As a result, the memory 120 may temporarily store the first data DATA1. Next, the controller 100 transmits the first data DATA1 to the host 20, and execution of the direct load operation may be completed.

Figure 29:
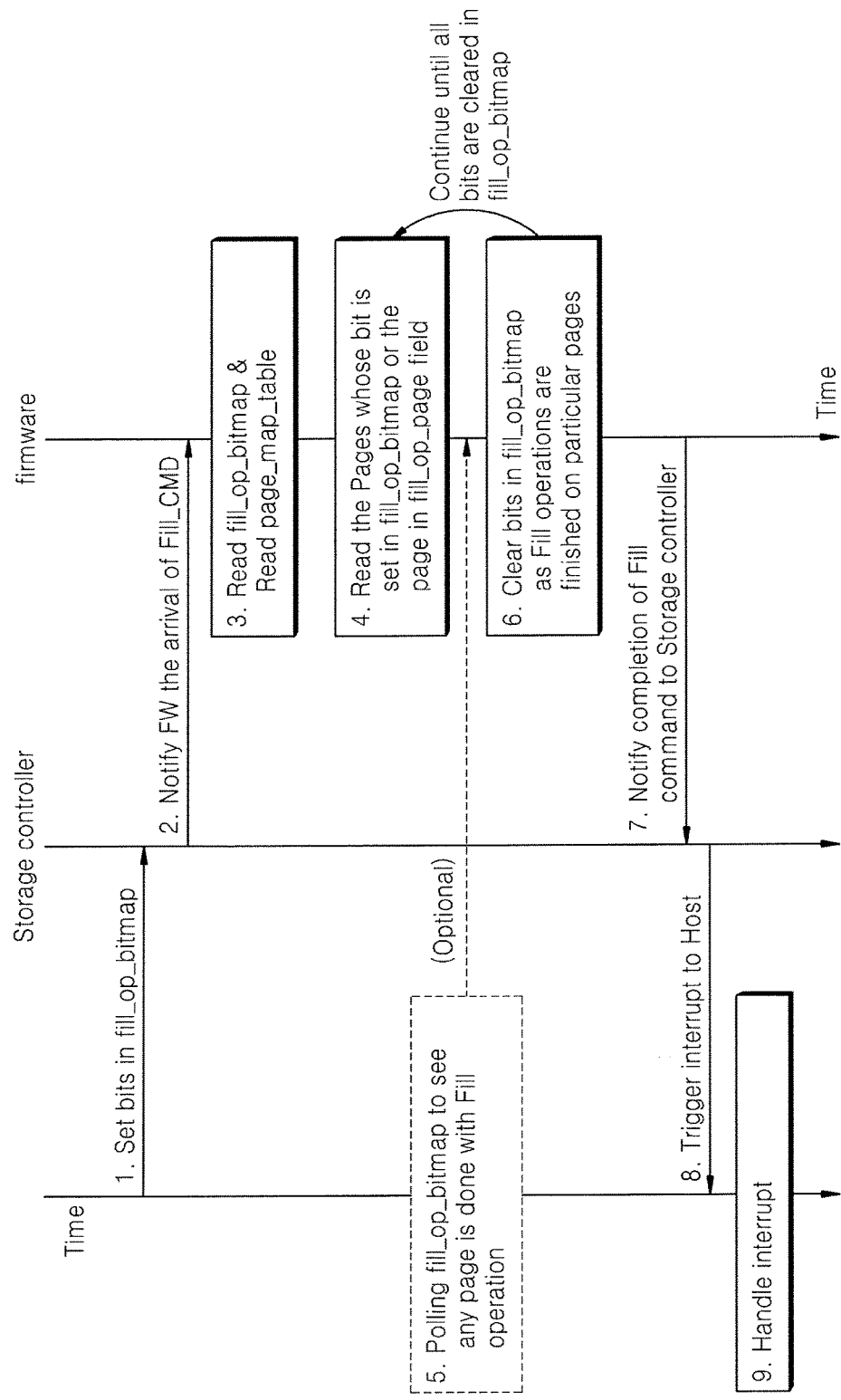
FIG. 29 is a diagram showing an example of a fill operation shown in FIG. 28 according to an exemplary embodiment of the present inventive concept.

FIG. 29 is a diagram of an example of the fill operation shown in FIG. 28 according to an exemplary embodiment of the present inventive concept.

Referring to FIG. 29, the fill operation of an exemplary embodiment corresponds to executing a fill command received from the host if there is no available data in the memory of the storage device. Hereinafter, the fill operation of an exemplary embodiment will be described with reference to FIGS. 1, 28 and 29.

First, the host 20 sets bits in a fill operation bitmap fill_op_bitmap. Next, the controller 100 notifies the firmware in the processing unit 110 of the arrival of the fill command Fill_CMD.

Then, the firmware reads the fill operation bitmap fill_op_bitmap to read a page map table page_map_table. In addition, the firmware reads pages corresponding to the bits that are set in the fill operation bitmap fill_op_bitmap or the fill operation page fields. During operation of the firmware, the host 20 may selectively perform polling of the fill operation bitmap fill_op_bitmap in order to check whether the fill operation with respect to an arbitrary page is finished. Then, when the fill operations with respect to certain pages are finished, the firmware clears the bits in the fill operation bitmap fill_op_bitmap, and repeatedly performs the above operations until all bits in the fill operation bitmap fill_op_bitmap are cleared.

Next, the firmware notifies the controller 100 of the completion of the fill operation. The controller 100 triggers an interrupt in the host 20, and the host 20 processes the interrupt.

Figure 30:
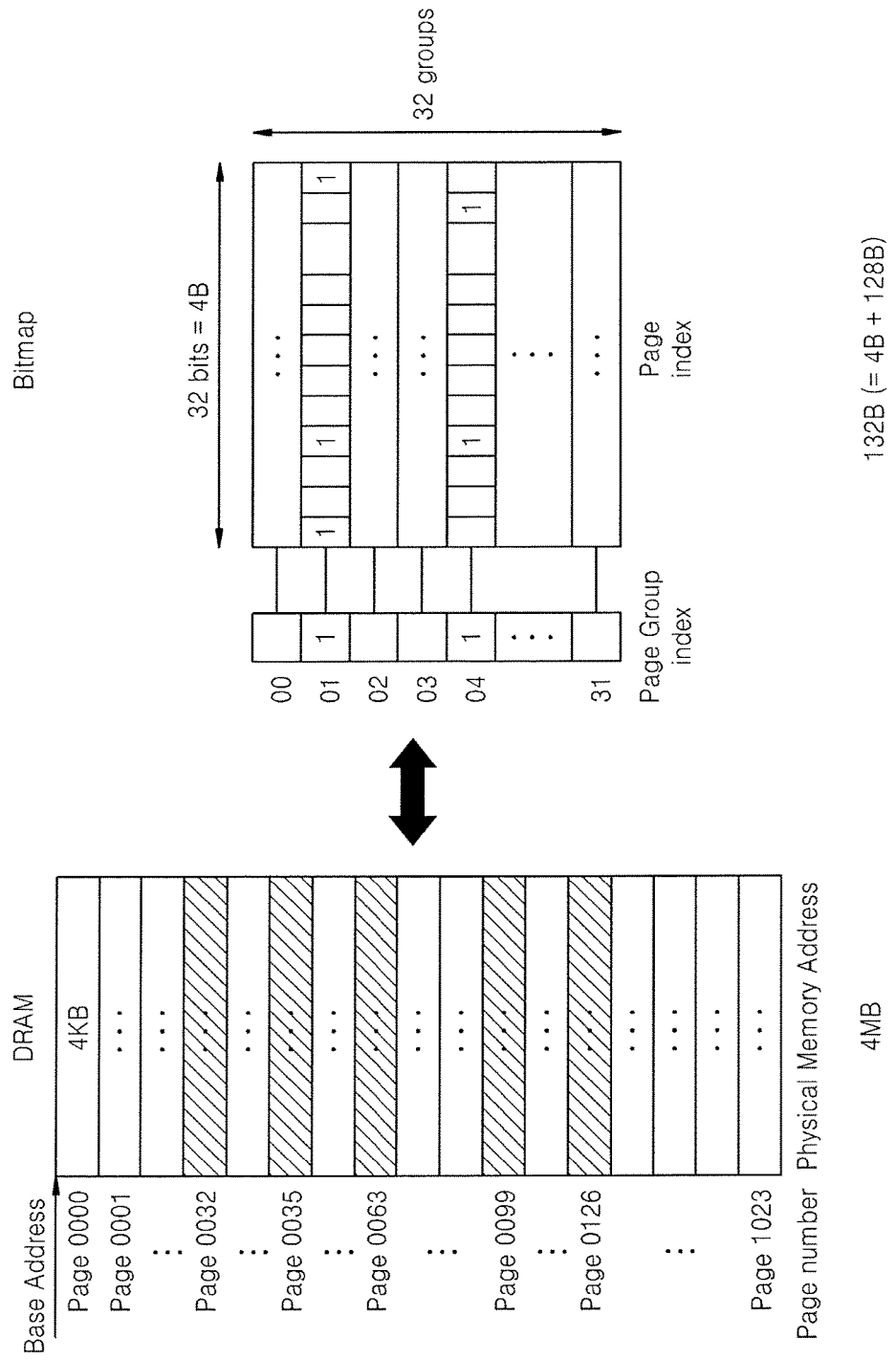
FIG. 30 is a diagram showing an example of an operation of setting a fill operation bitmap shown in FIG. 29 according to an exemplary embodiment of the present inventive concept.

FIG. 30 is a diagram of an example of an operation of setting the fill operation bitmap fill_op_bitmap shown in FIG. 29 according to an exemplary embodiment of the present inventive concept.

Referring to FIG. 30, the memory, for example, the DRAM, may include 1024 pages (page 0000 through page 1023), and a size of each page may be 4 KB. For example, numbers of target pages in which the fill operations are performed may be {0032, 0035, 0063} and {0099, 0126}. The host 20 may generate a fill operation bitmap fill_op_bitmap in which bits corresponding to the numbers of the target pages are set as '1', and may perform the fill operation by using the fill operation bitmap fill_op_bitmap. It is to be understood that FIG. 30 is exemplary, and exemplary embodiments are not limited thereto.

Figure 31:
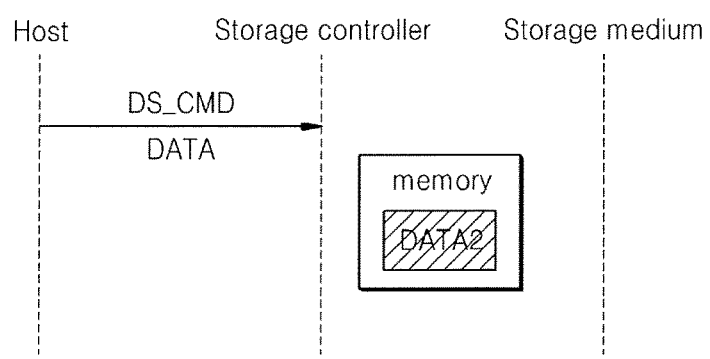
FIG. 31 is a schematic diagram of a direct store operation according to an exemplary embodiment of the present inventive concept.

FIG. 31 is a schematic diagram of a direct store operation according to an exemplary embodiment of the present inventive concept.

Referring to FIG. 31, the direct store operation according to an exemplary embodiment corresponds to performing a direct store command received from the host if there is an available space in the memory of the storage device. Hereinafter, the direct store operation according to an exemplary embodiment will be described with reference to FIGS. 1 and 31.

First, the host 20 transmits a direct store command DS_CMD to the controller 100. Here, the memory 120 in the controller 100 has an available space for storing data. The available space may store second data DATA2 corresponding to the direct store command DS_CMD. The second data DATA2 is the data to be stored at the host 20. Next, the host 20 directly stores the second data DATA2 in the memory 120 of the controller 100, and accordingly, the execution of the direct store operation may be completed.

Figure 32:
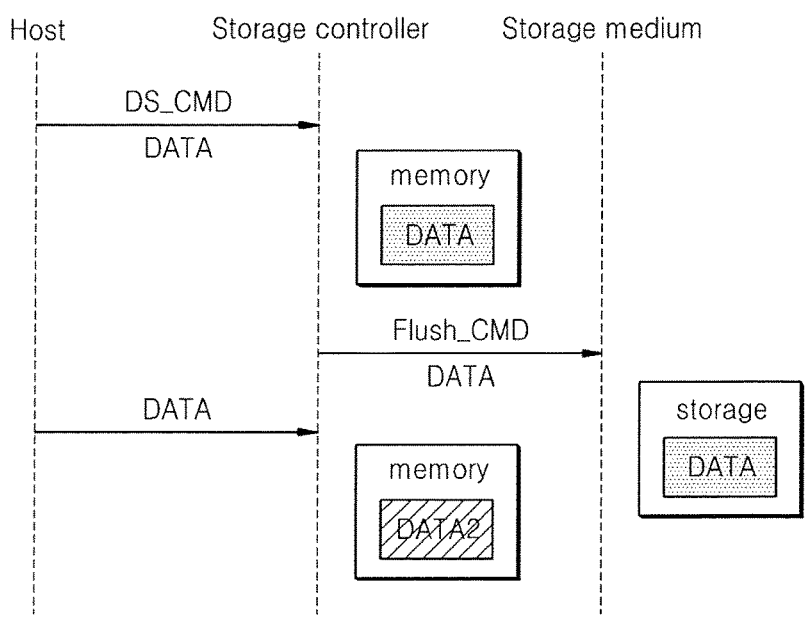
FIG. 32 is a schematic diagram of a direct store operation according to an exemplary embodiment of the present inventive concept.

FIG. 32 is a schematic diagram of a direct store operation according to an exemplary embodiment of the present inventive concept.

Referring to FIG. 32, the direct store operation according to an exemplary embodiment corresponds to performing the direct store command received from the host if there is no available space in the memory of the storage device. Hereinafter, the direct store operation according to an exemplary embodiment will be described with reference to FIGS. 1 and 32.

First, the host 20 transmits the direct store command DS_CMD to the controller 100. Here, the memory 120 in the controller 100 has no available space (e.g., the memory 120 is filled with other data).

Next, the controller 100 transmits a flush command FLUSH_CMD to the storage medium 200, and transfers the data filled in the memory 120 to the storage medium 200. Here, the flush command FLUSH_CMD may be generated by the host 20. As such, the memory 120 may ensure an available space.

In addition, the host 20 directly writes the second data DATA2 in the memory 120 of the controller 100. Accordingly, execution of the direct store operation may be completed.

Figure 33:
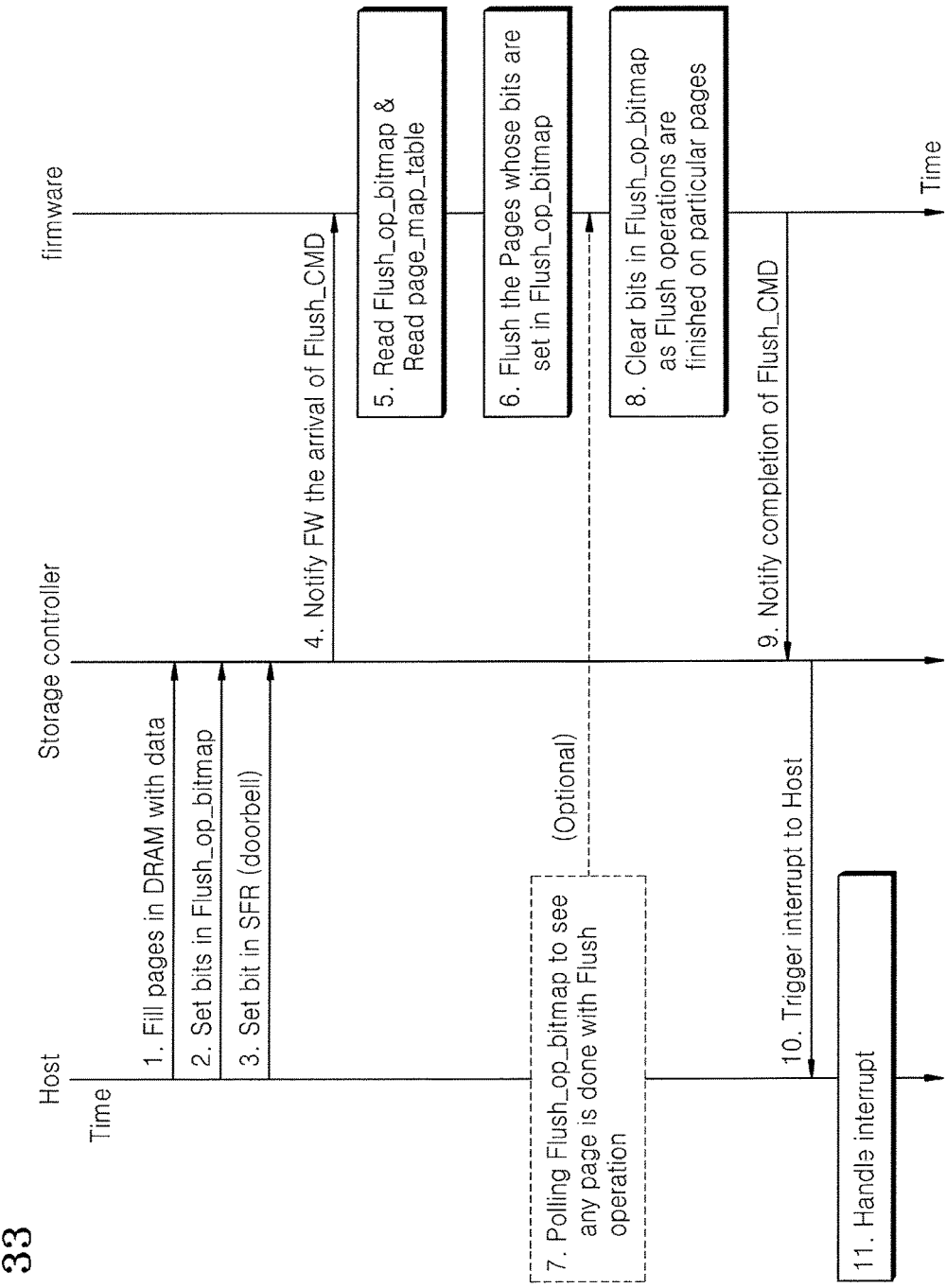
FIG. 33 is a diagram showing an example of a flush operation shown in FIG. 32 according to an exemplary embodiment of the present inventive concept.

FIG. 33 is a diagram of an example of the flush operation shown in FIG. 32 according to an exemplary embodiment of the present inventive concept.

Referring to FIG. 33, the flush operation according to an exemplary embodiment corresponds to executing the flush command received from the host if there is no available space in the memory of the storage device. Hereinafter, the flush operation according to an exemplary embodiment will be described with reference to FIGS. 1, 32 and 33.

First, the host 20 fills pages of the memory 120, for example, DRAM, with data, and sets bits in a flush operation bitmap flush_op_bitmap. The host 20 further sets the bits in the SFR, and may initiate the operation by setting the doorbell as '1'. Then, the controller 100 notifies the firmware in the processing unit 110 of the arrival of the flush command FLUSH_CMD.

The firmware reads the flush operation bitmap flush_op_bitmap and reads the page map table. In addition, the firmware flushes the pages corresponding to the bits that are set in the flush operation bitmap flush_op_bitmap. During operation of the firmware, the host 20 may selectively perform a polling operation of the flush operation bitmap flush_op_bitmap to check whether the flush operation with respect to an arbitrary page is finished. Next, the firmware clears the bits in the flush operation bitmap flush_op_bitmap when the flush operations with respect to certain pages are finished.

In addition, the firmware notifies the controller 100 of the completion of the flush operation. Next, the controller 100 triggers an interrupt in the host 20, and the host 20 processes the interrupt.

Figure 34:
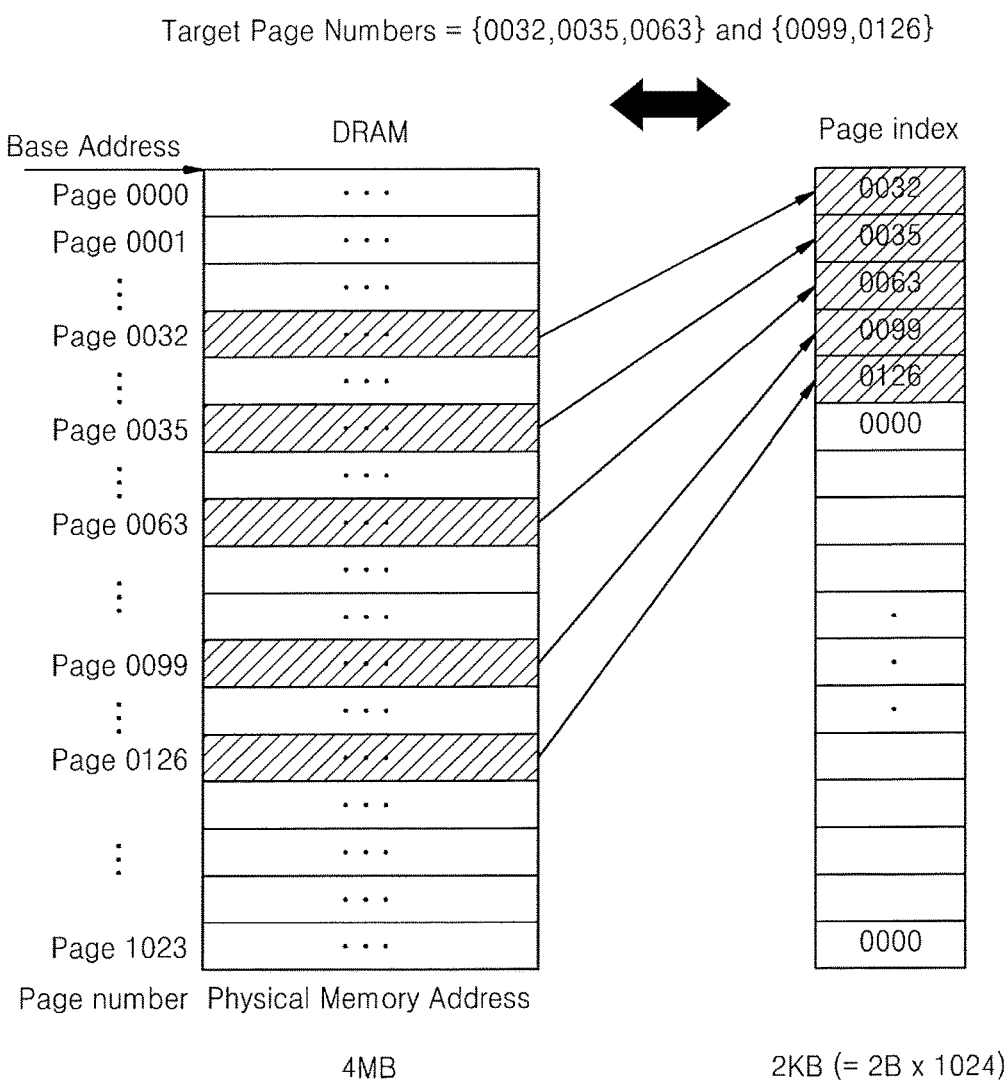
FIG. 34 is a diagram showing an example of an operation of setting a page index to be flushed, as shown in FIG. 33, according to an exemplary embodiment of the present inventive concept.

FIG. 34 is a diagram showing an example of an operation of setting an index in pages to be flushed included in FIG. 33 according to an exemplary embodiment of the present inventive concept.

Referring to FIG. 34, the memory 120, for example, the DRAM, may have 1024 pages (page 0000 through page 1023), and a size of each page may be 4 KB. For example, numbers of target pages in which the flush operations are performed may be {0032, 0035, 0063} and {0099, 0126}. The host 20 may separately manage the pages corresponding to the numbers of the target pages as page index, and may perform the flush operation using the page index. When the flush operation is finished, the page is reset as 0000, and accordingly, the memory 120 may have clearance space and the host 20 may directly store the data in the memory 120. It is to be understood that FIG. 34 is exemplary, and exemplary embodiments are not limited thereto.

Figure 35:
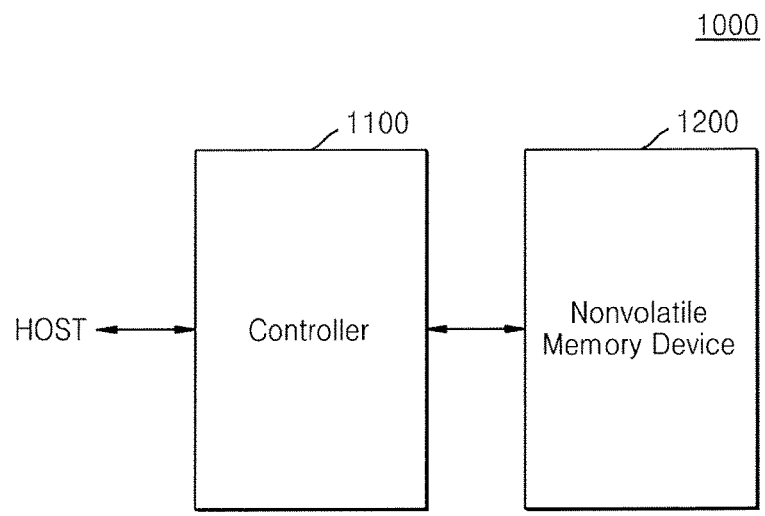
FIG. 35 is a block diagram of a memory system according to an exemplary embodiment of the present inventive concept.

FIG. 35 is a block diagram of a memory system 1000 according to an exemplary embodiment of the present inventive concept.

Referring to FIG. 35, the memory system 1000 may include a controller 1100 and a nonvolatile memory device 1200. The controller 1100 may be the controller 100 of FIG. 1, and the nonvolatile memory device 1200 may include the storage medium 200 of FIG. 1.

The controller 1100 is configured to access the nonvolatile memory device 1200 in response to a request from a host. For example, the controller 1100 is configured to control reading, writing, erasing, and background operations of the nonvolatile memory device 1200. The controller 1100 is further configured to provide an interface between the nonvolatile memory device 1200 and the host, and may be configured to drive firmware for controlling the nonvolatile memory device 1200.

The nonvolatile memory device 1200 or the memory system 1000 according to exemplary embodiments of the present inventive concept may be mounted using various types of packages. For example, the nonvolatile memory device 1200 or the memory system 1000 may be mounted by using a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline integrated chip (SOIC), a shrink small outline package (SSOP), a thin small outline package (TSOP), a thin quad flat pack (TQFP), a system in package (SIP), a multichip package (MCP), a wafer-level fabricated package (WFP), or a wafer-level processed stack package (WSP).

Figure 36:
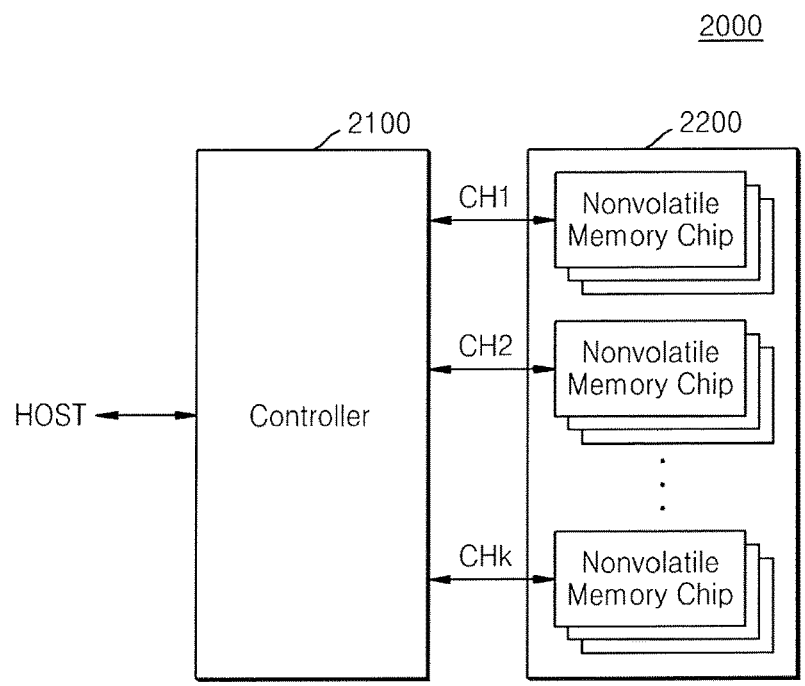
FIG. 36 is a block diagram of a storage system according to an exemplary embodiment of the present inventive concept.

FIG. 36 is a block diagram of a storage system 2000 according to an exemplary embodiment of the present inventive concept.

Referring to FIG. 36, the storage system 2000 may include a controller 2100 and a nonvolatile memory device 2200. The controller 2100 may be the controller 100 of FIG. 1, and the nonvolatile memory device 2200 may include the storage medium 200 of FIG. 1.

The nonvolatile memory device 2200 includes a plurality of nonvolatile memory chips. The plurality of nonvolatile memory chips may be divided into a plurality of groups. Each of the groups of the plurality of nonvolatile memory chips may be configured to communicate with the controller 2100 via common channels. For example, the plurality of nonvolatile memory chips may communicate with the controller 2100 via first through k-th channels CH1 through CHk.

In FIG. 36, the plurality of nonvolatile memory chips are connected to one channel. However, exemplary embodiments are not limited thereto. For example, the memory system 2000 may be configured such that one nonvolatile memory chip is connected to one channel.

Figure 37:
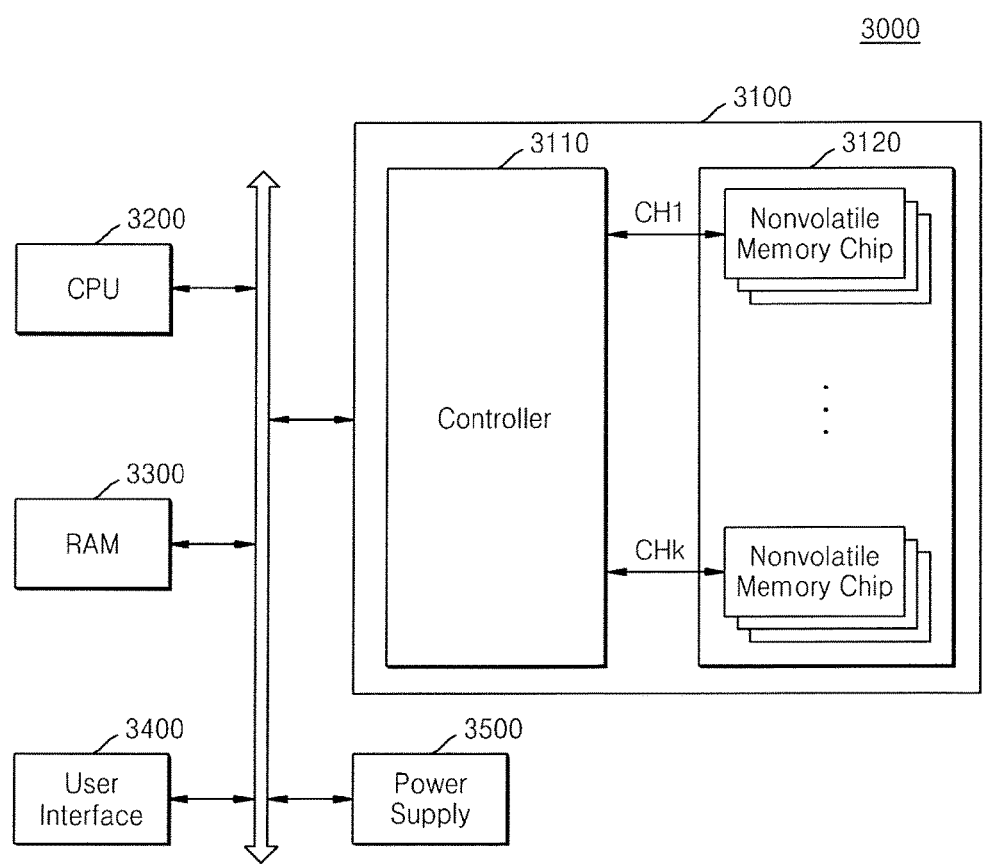
FIG. 37 is a block diagram of a user device according to an exemplary embodiment of the present inventive concept.

FIG. 37 is a block diagram of a user device 3000 according to an exemplary embodiment of the present inventive concept.

Referring to FIG. 37, the user device 3000 may include a memory system 3100, a central processing unit 3200, a RAM 3300, a user interface 3400, and a power source 3500. The memory system 3100 is electrically connected to the central processing unit 3200, the RAM 3300, the user interface 3400, and the power source 3500 via a system bus. Data provided through the user interface 3400 or processed by the central processing unit 3200 may be stored in the memory system 3100.

The memory system 3100 may include a controller 3110 and a nonvolatile memory device 3120. The controller 3110 may be the controller 100 of FIG. 1, and the nonvolatile memory device 3120 may be the storage medium 200 of FIG. 1. The nonvolatile memory device 3120 may include a plurality of nonvolatile memory chips. In FIG. 37, the nonvolatile memory device 3120 is connected to the system bus via the controller 3110. However, exemplary embodiments are not limited thereto. For example, the nonvolatile memory device 3120 may be directly connected to the system bus.

Figure 38:
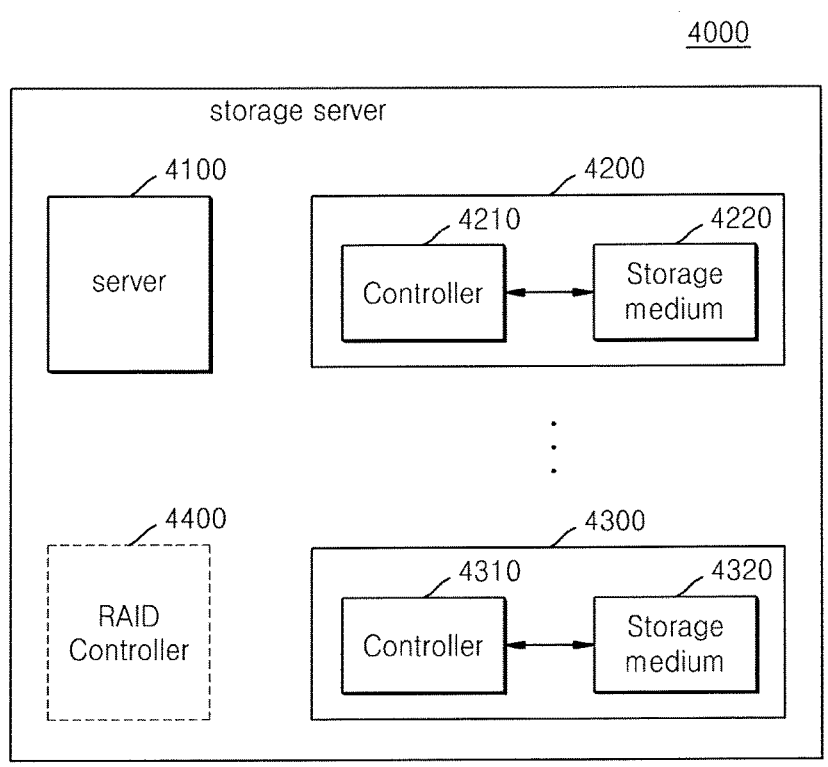
FIG. 38 is a block diagram of a storage server according to an exemplary embodiment of the present inventive concept.

FIG. 38 is a block diagram of a storage server 4000 according to an exemplary embodiment of the present inventive concept.

Referring to FIG. 38, the storage server 4000 may include a server 4100 and a plurality of storage devices including, for example, a first storage device 4200 and a second storage device 4300. The storage server 4000 may further include a RAID controller 4400.

The first storage device 4200 may include a controller 4210 and a storage medium 4220. The second storage device 4300 may include a controller 4310 and a storage medium 4320. The controllers 4210 and 4310 may be the controller 100 of FIG. 1, and the storage mediums 4220 and 4320 may be the storage medium 200 of FIG. 1.

Figure 39:
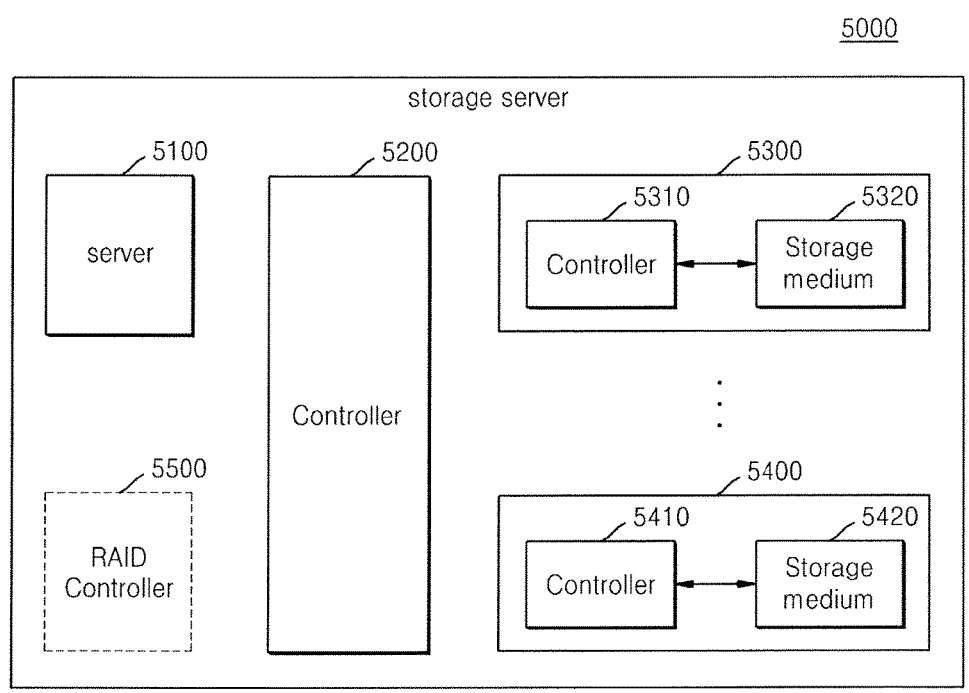
FIG. 39 is a block diagram of a storage server according to an exemplary embodiment of the present inventive concept.

FIG. 39 is a block diagram of a storage server 5000 according to an exemplary embodiment of the present inventive concept. Referring to FIG. 39, the storage server 5000 may include a server 5100, a controller 5200, and a plurality of storage devices including, for example, a first storage device 5300 and a second storage device 5400. The storage server 5000 may further include a RAID controller 5500.

The first storage device 5300 may include a controller 5310 and a storage medium 5320. The second storage device 5400 may include a controller 5410 and a storage medium 5420. The first and second controllers 5310 and 5410 may be the controller 100 of FIG. 1, and the storage mediums 5320 and 5420 may be the storage medium 200 of FIG. 1.

Figure 40:
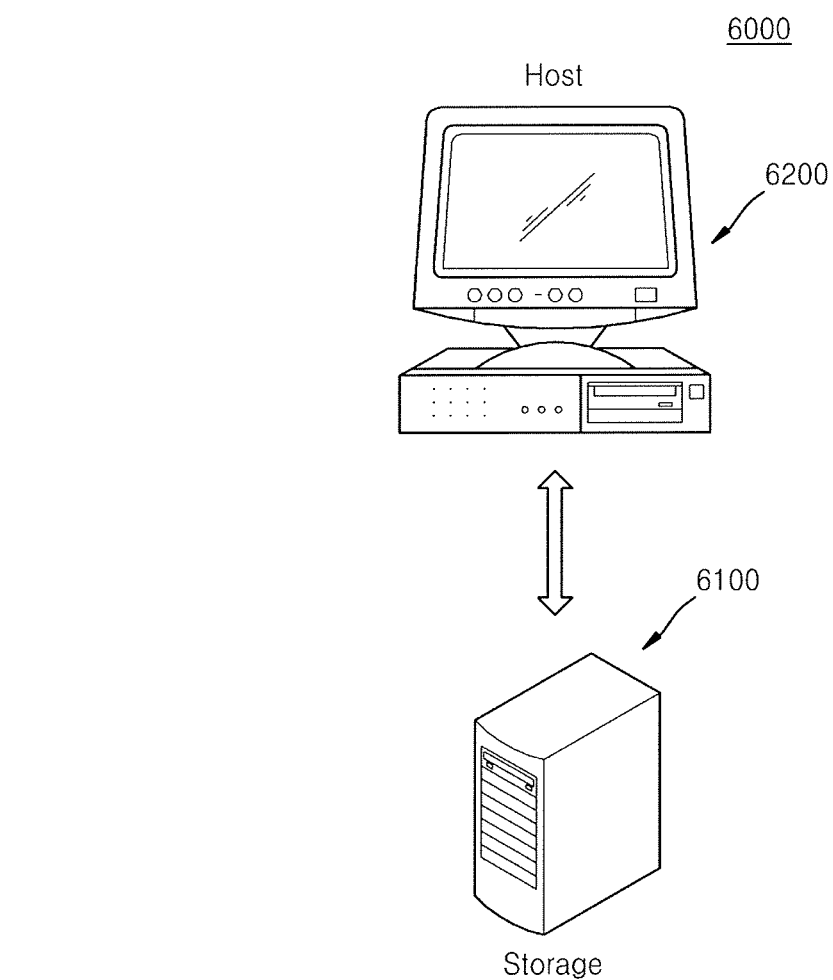
FIGS. 40 through 42 are schematic diagrams of systems in which the storage devices according to one or more exemplary embodiments of the present inventive concept are provided.

FIG. 40 is a schematic diagram of a system 6000 to which the storage device according to exemplary embodiments of the present inventive concept may be applied.

Referring to FIG. 40, a semiconductor device including the storage device according to the exemplary embodiments of the present inventive concept described herein may be applied to a storage device 6100. The system 6000 may include a host 6200 and the storage device 6100 communicating with the host 6200 via a wired or wireless connection. The storage device 6100 may be one of the storage devices according to the exemplary embodiments of the present inventive concept described above (e.g., storage device 10 of FIG. 1).

Figure 41:
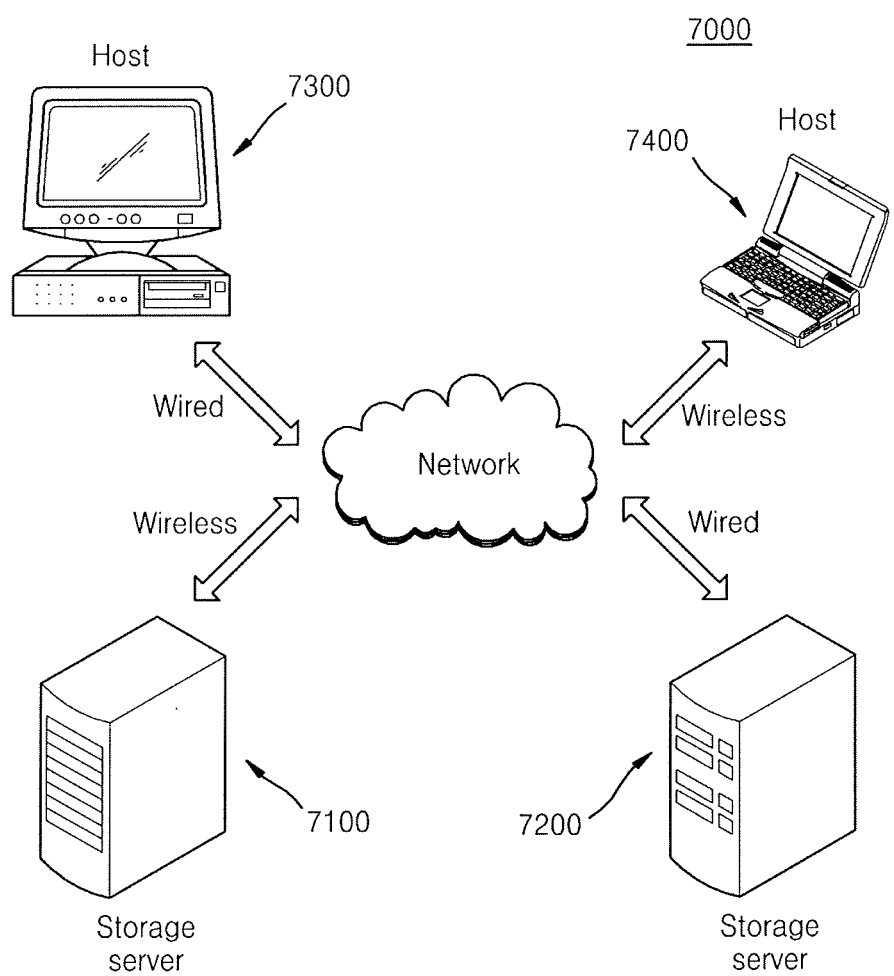

FIG. 41 is a schematic diagram of a system 7000 to which a storage device according to exemplary embodiments of the present inventive concept may be applied.

Referring to FIG. 41, a semiconductor device including the storage device according to the exemplary embodiments of the present inventive concept described herein may be applied to storage servers 7100 and 7200. The system 7000 may include a plurality of hosts 7300 and 7400 and a plurality of storage servers 7100 and 7200. The storage servers 7100 and 7200 may include one of the storage device according to the exemplary embodiments of the present inventive concept described above (e.g., storage device 10 of FIG. 1).

Figure 42:
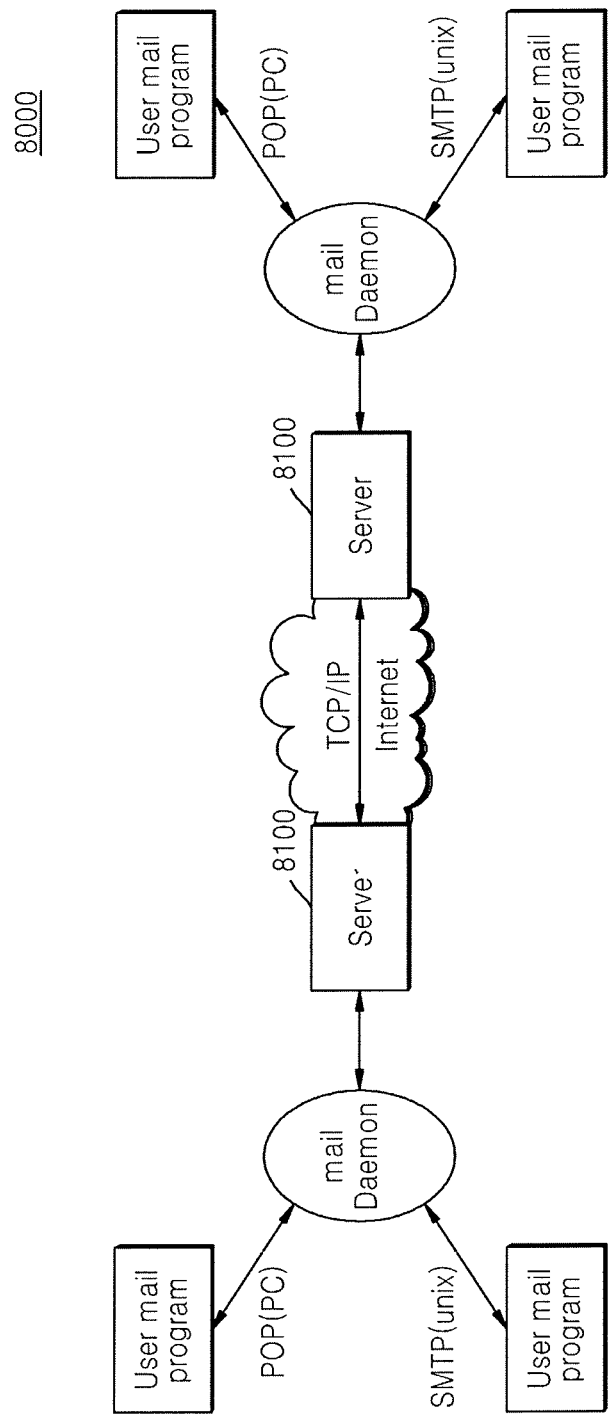

FIG. 42 is a schematic diagram of a system 8000 to which the storage device according to exemplary embodiments of the present inventive concept may be applied.

Referring to FIG. 42, a semiconductor device including the storage device according to the exemplary embodiments of the present inventive concept described herein may be applied to a server 8100 utilized for implementing email.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A storage device, comprising:
a storage medium; and
a controller configured to control the storage medium, wherein the controller comprises:
an interface unit configured to interface with a host;
a processing unit connected to the interface unit via a first signal line, and configured to process a direct load operation and a direct store operation between the host and the controller;
at least one memory connected to the interface unit via a second signal line, wherein the at least one memory is configured to temporarily store data read from the storage medium or data received from the host, and is configured to be directly accessed by the host;
a first bus connected to the interface unit;
a second bus connected to the processing unit; and
a third bus connected to the at least one memory,
wherein the first signal line connects the first bus to the second bus without connecting through the third bus, and the second signal line connects the first bus to the third bus without connecting through the second bus.

2. The storage device of claim 1, wherein the interface unit is a first interface unit configured to interface with the host according to a first standardized interface, and the controller further comprises a second interface unit configured to interface with the first interface unit according to a second standardized interface.

3. The storage device of claim 2, wherein the first signal line connects the first interface unit and the processing unit to each other without connecting through the second interface unit, and the second signal line connects the first interface unit and the at least one memory to each other without connecting through the second interface unit.

4. The storage device of claim 2, wherein the first standardized interface is a peripheral component interconnect express (PCIe) interface and the second standardized interface is a nonvolatile memory express (NVMe) interface or a small computer system interface express (SCSIe) interface.

5. The storage device of claim 1, wherein the processing unit comprises:
at least one processor configured to process the direct load operation and the direct store operation; and
at least one tightly coupled memory (TCM) disposed adjacent to the at least one processor and accessible by the at least one processor.

6. The storage device of claim 5, wherein the at least one TCM is configured to temporarily store a data transfer command transmitted between the controller and the storage medium.

7. The storage device of claim 6, wherein the data transfer command comprises:
a flush command configured to transmit data temporarily stored in the at least one memory to the storage medium, wherein the data is stored in the storage medium in response to the flush command; and
a fill command configured to transmit the data stored in the storage medium to the at least one memory.

8. The storage device of claim 5, wherein the at least one TCM comprises at least one special function register (SFR) configured to perform the direct load operation and the direct store operation.

9. The storage device of claim 1, wherein the at least one memory comprises at least one of a first memory configured to temporarily store raw data read from the storage medium or raw data received from the host, and a second memory configured to temporarily store metadata corresponding to the raw data.

10. The storage device of claim 9, wherein at least one of the first memory and the second memory comprises at least one special function register (SFR) configured to perform the direct load operation and the direct store operation.

11. The storage device of claim 1, wherein the interface unit comprises:
a signal transfer unit configured to transmit and receive a signal to and from the host; and
an address conversion unit configured to perform an address conversion between an external address of the signal and an internal address suitable for internal communication within the controller.

12. A computing system, comprising:
a storage device comprising a storage medium and a controller configured to control the storage medium, wherein the controller comprises:
at least one memory disposed in the controller; and
a host configured to directly access the at least one memory using an address map having an address space corresponding to the at least one memory,
wherein the host is disposed external to the storage device, and the host comprises:
a processor; and
a main memory disposed in the host and connected to the processor,
wherein the processor is configured to directly access the at least one memory without accessing the main memory during a direct load/store operation, and
wherein the processor is configured to directly access the main memory without accessing the at least one memory during a normal load/store operation, wherein the controller further comprises:
an interface unit configured to interface with the host;
a processing unit connected to the interface unit via a first signal line, wherein the at least one memory is connected to the interface unit via a second signal line;
a first bus connected to the interface unit;
a second bus connected to the processing unit; and
a third bus connected to the at least one memory,
wherein the first signal line connects the first bus to the second bus without connecting through the third bus and the second signal line connects the first bus to the third bus without connecting thorough the second bus.

13. The computing system of claim 12, wherein the processing unit comprises:
at least one processor configured to process the direct load operation and the direct store operation; and
at least one tightly coupled memory (TCM) disposed adjacent to the at least one processor and accessible by the at least one processor.

14. The computing system of claim 13, wherein the at least one memory and the at least one TCM are respectively mapped to address spaces that are exclusive from each other in the address map.

15. The computing system of claim 12, wherein the host comprises a plurality of base address registers (BARs) configured to store the address map, and at least one BAR from among the plurality of BARs is configured to store address spaces that are exclusive from each other and that are used for performing a direct load operation and a direct store operation with respect to the at least one memory.

16. The computing system of claim 12, wherein the interface unit is a first interface unit configured to interface with the host according to a first standardized interface, and the controller further comprises a second interface unit configured to interface with the first interface unit according to a second standardized interface.

17. A computing system, comprising:
a storage device comprising a storage medium and a controller configured to control the storage medium, wherein the controller comprises:
an interface unit configured to interface with a host;
a processing unit connected to the interface unit via a first signal line;
at least one memory connected to the interface unit via a second signal line;
a first bus connected to the interface unit;
a second bus connected to the processing unit; and
a third bus connected to the at least one memory,
wherein the first signal line connects the first bus to the second bus without connecting through the third bus, and the second signal line connects the first bus to the third bus without connecting through the second bus; and
the host comprising a processor and a main memory connected to the processor, wherein the processor is configured to directly access the at least one memory without accessing the main memory.

18. The storage device of claim 17, wherein the interface unit is a first interface unit configured to interface with the host according to a first standardized interface, and the controller further comprises a second interface unit configured to interface with the first interface unit according to a second standardized interface.

19. The storage device of claim 18, wherein the first signal line connects the first interface unit and the processing unit to each other without connecting through the second interface unit, and the second signal line connects the first interface unit and the at least one memory to each other without connecting through the second interface unit.

* * * * *